US008254317B2

(12) United States Patent
Gu et al.

(10) Patent No.: US 8,254,317 B2
(45) Date of Patent: Aug. 28, 2012

(54) METHOD FOR PROCESSING DYNAMIC SERVICE FLOWS AND NETWORK-SIDE SERVICE FLOWS AND A COMMUNICATION APPARATUS

(75) Inventors: Liang Gu, Shenzhen (CN); Jianjun Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 845 days.

(21) Appl. No.: 12/212,808

(22) Filed: Sep. 18, 2008

(65) Prior Publication Data

US 2009/0052390 A1    Feb. 26, 2009

Related U.S. Application Data

(63) Continuation of application No. PCT/CN2007/000935, filed on Mar. 22, 2007.

(30) Foreign Application Priority Data

Mar. 22, 2006 (CN) .......................... 2006 1 0058593
Mar. 22, 2006 (CN) .......................... 2006 1 0058594

(51) Int. Cl.
    *H04W 4/00* (2009.01)
(52) U.S. Cl. .................... 370/329; 370/235; 370/400
(58) Field of Classification Search .................. 370/230, 370/230.1, 231–235, 328–329, 336, 341, 370/345–346, 400–401
See application file for complete search history.

(56) References Cited

U.S. PATENT DOCUMENTS

| 6,134,434 | A | 10/2000 | Krishnamurthi et al. | |
|---|---|---|---|---|
| 7,123,594 | B2 * | 10/2006 | Yang | 370/328 |
| 7,142,512 | B1 * | 11/2006 | Kobayashi et al. | 370/232 |
| 7,391,724 | B2 * | 6/2008 | Alakoski et al. | 370/230 |
| 7,400,583 | B2 * | 7/2008 | Friskney et al. | 370/235 |
| 7,630,338 | B2 * | 12/2009 | Vesterinen et al. | 370/329 |
| 7,738,425 | B2 * | 6/2010 | Kim et al. | 370/331 |
| 7,773,513 | B2 * | 8/2010 | Beaujean et al. | 370/230 |
| 7,787,418 | B2 * | 8/2010 | Chou | 370/329 |
| 7,826,353 | B2 * | 11/2010 | Honkasalo et al. | 370/230 |
| 7,916,732 | B2 * | 3/2011 | Rydnell et al. | 370/395.21 |

(Continued)

FOREIGN PATENT DOCUMENTS

CN    1633202 A    6/2005

(Continued)

OTHER PUBLICATIONS

Rajagopalan, B., et al., "Stage 3 QoS Section," WiMAX Forum Network Working Group, 060223-Stage3-QoS.doc, Intel, Cisco, Alvarion, Siemens, Alcatel, Feb. 23, 2006, 20 pages.

(Continued)

*Primary Examiner* — Chi H. Pham
*Assistant Examiner* — Kevin Mew
(74) *Attorney, Agent, or Firm* — Slater & Matsil, L.L.P.

(57) ABSTRACT

A method for processing dynamic service flows includes a SFM entity that sends a resource processing request to a H-PF server through an anchor SFA entity according to the received dynamic service flow processing request, with the request carrying the parameters related to the resource processing request. The H-PF server sends the result of the resource processing performed by each node in the network according to the resource requirements from the SFM through a resource processing response. The SFM returns a service flow processing response to the UE. After receiving the response, the UE saves the relevant parameters, and returns an acknowledgement to the SFM.

12 Claims, 33 Drawing Sheets

U.S. PATENT DOCUMENTS

| | | | |
|---|---|---|---|
| 8,014,330 B2 * | 9/2011 | Kim et al. | 370/312 |
| 2004/0160963 A1 | 8/2004 | Dong et al. | |
| 2005/0215279 A1 | 9/2005 | Shim et al. | |
| 2006/0028986 A1 * | 2/2006 | Kwon et al. | 370/230 |
| 2007/0201366 A1 * | 8/2007 | Liu | 370/235 |
| 2007/0297329 A1 * | 12/2007 | Park et al. | 370/230.1 |
| 2008/0144494 A1 * | 6/2008 | Casey | 370/230 |
| 2009/0092045 A1 * | 4/2009 | Wu et al. | 370/230 |
| 2011/0286331 A1 * | 11/2011 | Lauer | 370/235 |

FOREIGN PATENT DOCUMENTS

| | | |
|---|---|---|
| WO | WO-2005084146 | 9/2005 |

OTHER PUBLICATIONS

Written Opinion of the International Searching Authority, PCT/CN2007/000935, Date of mailing Jul. 5, 2007, 4 pages.

* cited by examiner

METHOD FOR PROCESSING DYNAMIC SERVICE FLOWS AND NETWORK-SIDE SERVICE FLOWS AND A COMMUNICATION APPARATUS

CROSS REFERENCE TO RELATED APPLICATIONS

This application is a continuation of International Patent Application Number PCT/CN2007/000935. filed on Mar. 22, 2007, which claims priority from Chinese Patent Application No. 200610058594.7, filed with the Chinese Patent Office on Mar. 22, 2006, and entitled "Method for Creating, Deleting and Modifying Dynamic Service Flows", and Chinese Patent Application No. 200610058593.2, filed with the Chinese Patent Office on Mar. 22, 2006, entitled "Method for Creating, Deleting and Modifying Network-side Service Flows", the contents of which are incorporated herein by reference in their entireties.

FIELD OF THE INVENTION

The present invention relates to the field of service flow technologies, and in particular, to a method for handling dynamic service flows and network-s service flows and a communication apparatus.

BACKGROUND

The Worldwide Interoperability for Microwave Access (WiMAX) is a radio metropolitan area network technology based on the IEEE 802.16 standard. As shown in FIG. 1a, the logic architecture of a WiMAX network includes three parts: Mobile Station System/Subscriber Station (MSS/SS), Access Service Network (ASN) and Connection Service Network (CSN), and includes logic entities such as Policy Flow (PF) server, Authentication Authorization Accounting (AAA) server, and Application Flow (AF) server. The Quality of Service (QoS) reference mode defined in the underway WiMAX standard draft is shown in FIG. 1b.

The Service Flow Management (SFM) entity is located in the ASN and is responsible for admission control, creation, activation, modification and deletion of service flows. An SFM entity includes an Admission Control (AC) unit and a local resource database correlated to the AC. A Service Flow Authorization (SFA) entity is located in an ASN for the purpose of authenticating and authorizing the requested service flows. Each MS/SS corresponds to only one anchor SFA. The anchor SFA entity interacts with the Policy Flow (PF) server. The SFA directly interacting with the SFM is called a serving SFA. The serving SFA may be the same entity as the anchor SFA. If they are different entities, more than one SFA may exist between them for the purpose of handling primitives related to relay QoS. Such SFA entities are called relay SFAs. A serving SFA and an anchor SFA must be aware of each other anytime. The anchor SFA executes policy management of the ASN level according to the Local Policy Database (LPD). An AF server is located in a home Network Service Provider (NSP). The MS/SS interacts with the AF directly through an application-layer protocol. An AF server may send a WiMAX service flow request to the PF server directly in order to trigger the PF server to send a Resource Reservation Request (RR-Request) to the ASN. A PF server is a policy service entity located in a home NSP. The entity related to the PF server is a user database, which includes the service policies that allow access and the corresponding preset QoS parameters.

Dynamic Service flow Addition (DSA) refers to creation of an application service flow initiated at the subscriber side. FIG. 2a shows the process of creating a dynamic service flow according to the existing standard draft. As shown in FIG. 2a, a Dynamic Service flow Addition Request (DSA-Request) sent by the Mobile Station (MS) triggers only the network-side policy decision process (PD-Request/Response). A Dynamic Service flow Addition Response (DSA-Response) is returned upon completion of the policy decision process. The creation of an air interface (R1 interface) is completed when the MS returns a Dynamic Service flow Addition Acknowledgement (DSA-ACK). At this time, the MS is ready to send data. However, the policy decision process defined by the existing standard draft executes only the admission process. Namely, after this process, the network side tells the MS only about the readiness of meeting the resource requirement (QoS requirement) of the MS. However, the network side neither allocates a Service Flow ID (SFID) for identifying the service flow nor creates a data path for transmitting service flows. At this time, it is impossible to transmit the service of the MS at all.

As analyzed above, the Dynamic Service flow Addition (DSA) process specified in the existing standard draft is incomplete, and does not enable data transmission; moreover, the existing standard draft specifies no detailed process of changing or deleting dynamic service flows.

Creation of a network-side service flow includes creation of a preset flow and creation of other network-side application service flows. The common feature is that the creation of service flows is initiated by the network side, and oriented to the user. FIG. 2b shows the process of creating a service flow at the network side according to the existing standard draft.

The process of creating a service flow at the network side is implemented by a Resource Reservation (RR) message. The corresponding air interface message is a dynamic service flow addition message (DSA-Request/Response/Acknowledge). However, after the creation process is completed, only an air interface connection is created, the data path in the ASN is not created, and the service cannot be transmitted normally.

As analyzed above, the process of creating a network-side service flow specified in the existing standard draft is incomplete, and does not enable data transmission; moreover, the existing standard draft specifies no detailed process of changing or deleting network-side service flows.

SUMMARY

The present invention provides a complete method for processing dynamic service flows, wherein the User Equipment (UE) sends a request of processing dynamic service flows, with a processing indication carried in the request; and the network side implements the following two processes:

Resource processing: The Service Flow Management (SFM) entity sends a resource processing request carrying the relevant parameters to the Home Policy Flow (H-PF) server through an anchor Service Flow Authorization (SFA) entity according to the received dynamic service flow processing request, and the H-PF server sends a resource processing response to the SFM entity, with the response carrying the results of resource processing performed by each node of the network according to the resource requirements; and Air interface acknowledgement: The SFM entity returns a service flow processing response to the UE; after receiving the response, the UE saves the relevant parameters and returns an acknowledgement to the SFM.

The present invention further provides a complete method for processing network-side service flows, wherein the network side implements the following process:

Resource processing: An anchor SFA entity sends a resource processing request to the SFM entity, with the request carrying a processing indication and the relevant parameters; the SFM entity decides to process the service flow processing request which is sent by the background UE and carries a processing indication; the UE saves the relevant parameters and returns a response to the SFM entity with respect to the dynamic service flow processing request; and the SFM entity sends a resource processing response to the SFA entity.

The present invention still further provides a complete communication apparatus, including:

a Service Flow Management (SFM) entity, adapted to receive dynamic service flow processing requests from the UE, send resource processing requests to the anchor Service Flow Authorization (SFA) entity, and/or receive resource processing requests from the anchor SFA entity, wherein the resource processing request carries a processing indication and relevant parameters, and the SFM entity sends a service flow processing request carrying a processing indication to the UE after deciding to perform processing.

Therefore, the present invention provides a complete method for processing dynamic service flows and network-side service flows on the basis of the existing standard draft, with the service flows being applicable upon completion of processing. The method improves the flexibility of operating dynamic service flows and network-side service flows significantly.

DETAILED DESCRIPTION

The method for creating, deleting and changing dynamic service flows and network-side service flows under the present invention is based on the QoS reference model defined in the WiMAX network standard draft. It not only perfects the Dynamic Service flow Addition (DSA) process, but also provides a complete Dynamic Service Change (DSC) process and a complete Dynamic Service Deletion (DSD) process. Two important parameters involved in the present invention are header compression rule and resource reservation type:

- the header compression rule parameter is designed to support the data compression algorithm applied in the communication between the use and the network. The three specific compression technologies are: PHS (see IEEE 802.16d/e), ROHC (see RFC3095), and ECRTP (see RFC3545). The specific compression technology is selected through negotiation with the network side when the MS accesses the network. The header compression rule parameter carried in the process of creating a service flow should include the parameter set required by the corresponding compression technology; and
- the resource reservation type parameter is designed to support the resource reservation protocol (RSVP). If the result of negotiation between the MS and the network side supports the RSVP, the resource reservation type parameter carried in the process of creating a service flow should include the parameter set required by the RSVP protocol.

The methods for creating, deleting and changing dynamic service flows and network-side service flows are hereinafter described in detail with reference to accompanying drawings. In the following embodiments, a Mobile Station (MS) is used as an example of UE. In the practical application, a UE may be a Subscriber Station (SS) or a Mobile Station System (MSS).

The processes of creating, deleting and changing a dynamic service flow according to an embodiment of the present invention are detailed hereinafter.

Figure 1A:
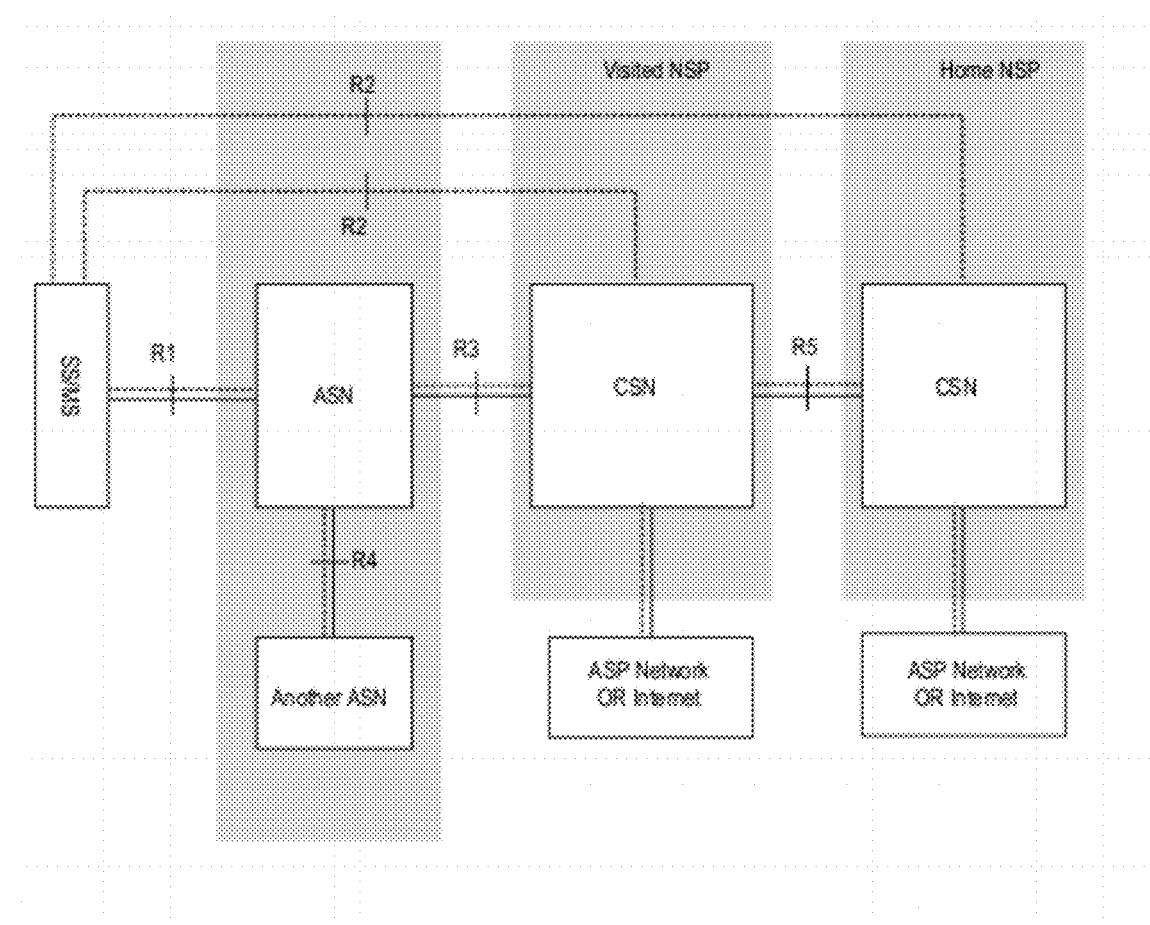
FIG. 1a shows the logic architecture of a WiMAX network.
Figure 1B:
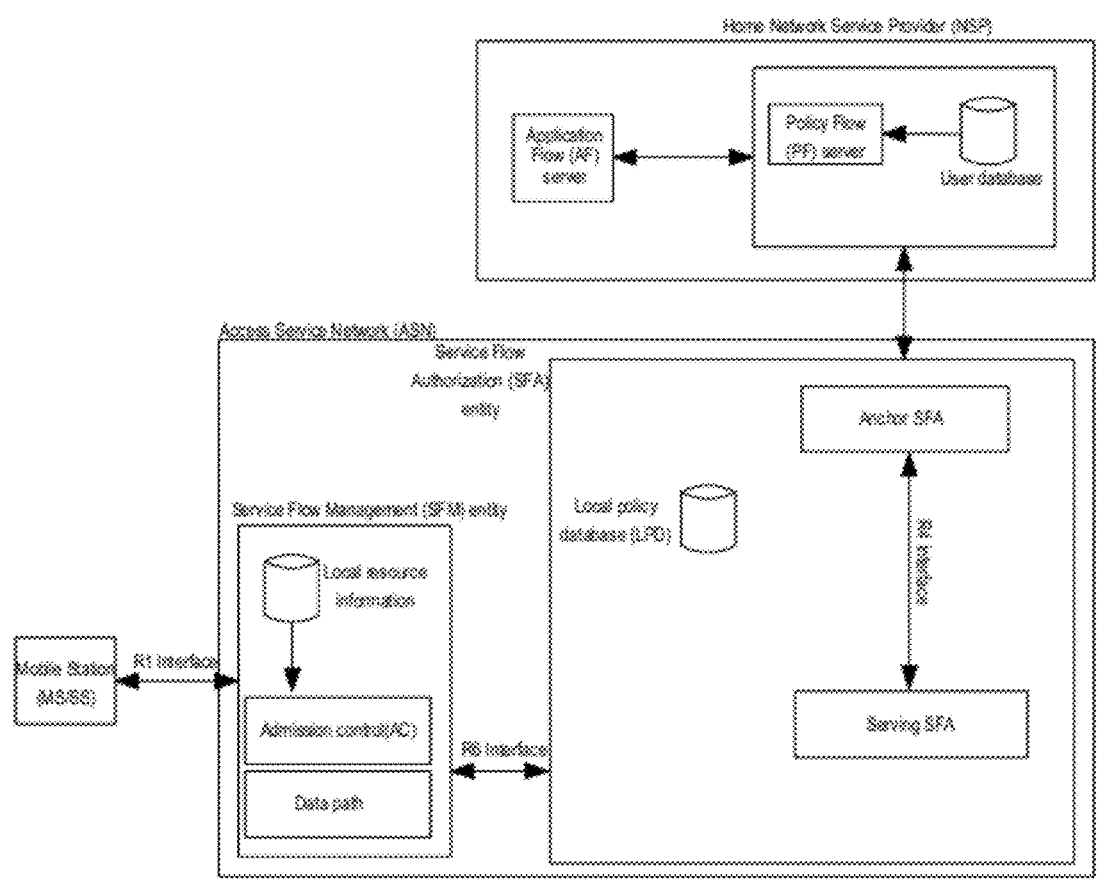
FIG. 1b is a QoS reference model in a WiMAX network.
Figure 2A:
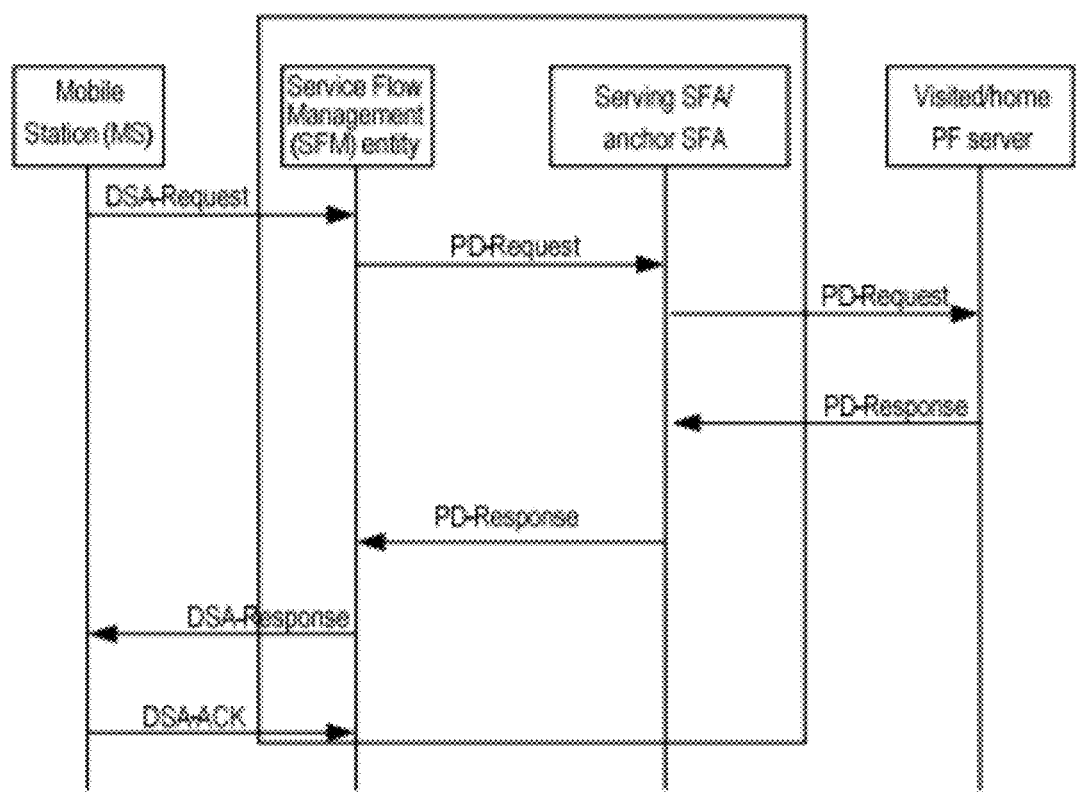
FIG. 2a shows the process of creating a dynamic service flow according to the existing standard draft.
Figure 2B:
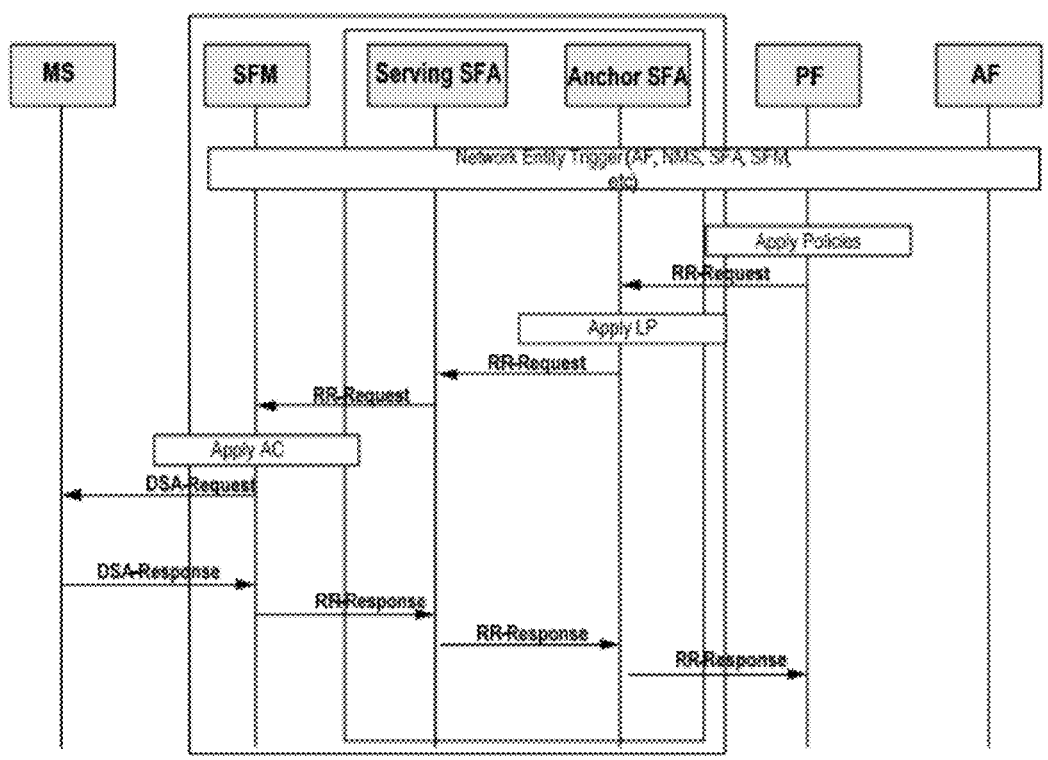
FIG. 2b shows the process of creating a network-side service flow according to the existing standard draft.
Figure 3:
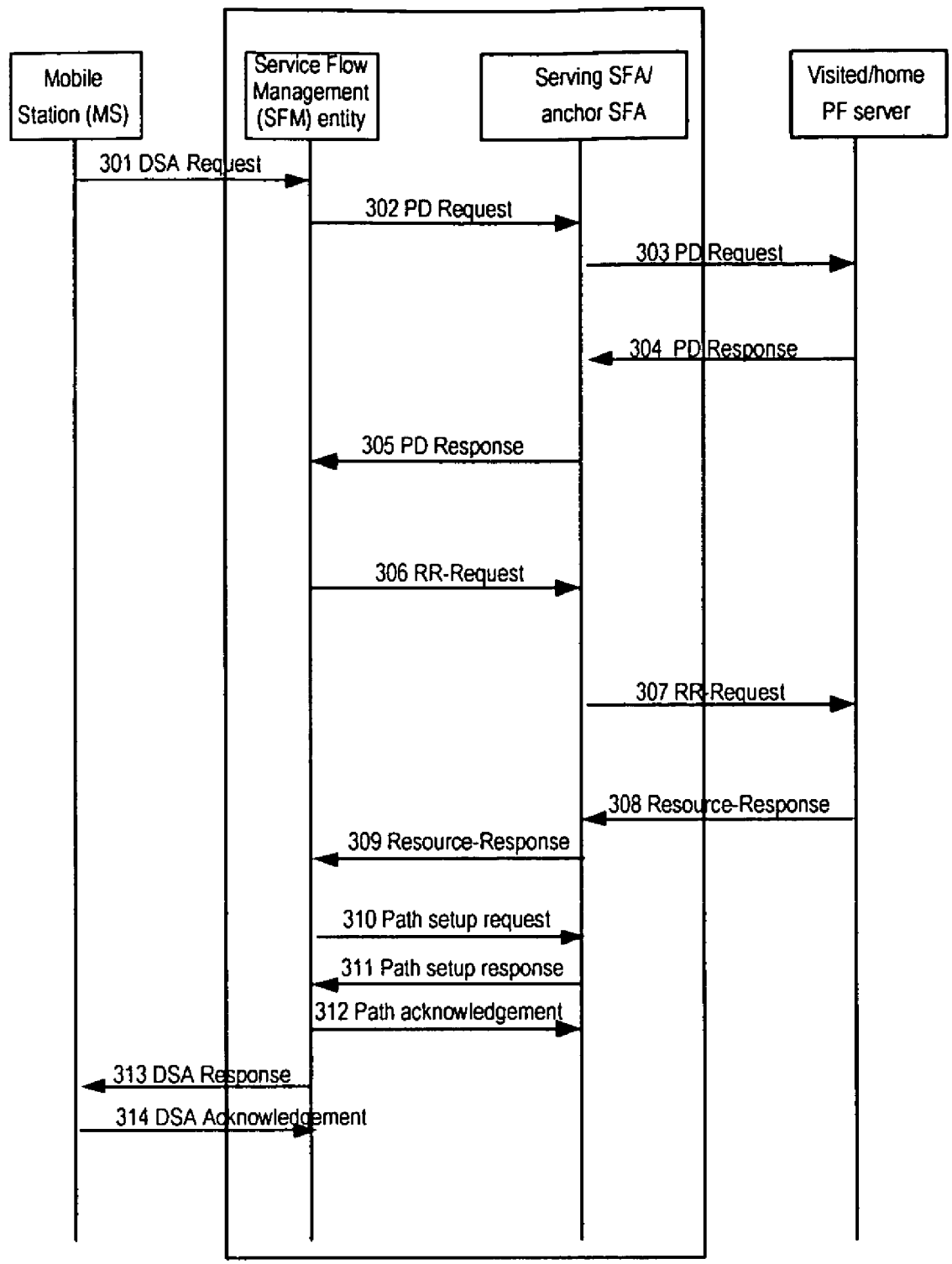
FIG. 3 is a flowchart in mode 1 of creating a dynamic service flow according to an embodiment of the present invention.

Embodiment 1: as shown in FIG. 3, a Dynamic Service flow Addition (DSA) process includes steps as described hereinafter.

Step 301: An MS sends a DSA-Request to the SFM entity.

Step 302: After receiving the DSA-Request, the SFM entity sends a policy decision request (PD-Request) to the anchor SFA entity through a serving SFA entity, with the request carrying the QoS parameter set required by the PD-Request. If the Anchor SFA and the Serving SFA exist in the same physical unit, the request message may be sent to the anchor SFA entity through the serving SFA entity; if the anchor SFA and the serving SFA are in different physical units, the request message may be sent to the anchor SFA entity through one or more relay SFA entities.

It is understandable that the serving SFA and the anchor SFA may be located in the same physical entity or in different physical entities. If the serving SFA and the anchor SFA are located in the same physical entity, the serving SFA and the anchor SFA are the same logic entity; if the serving SFA and the anchor SFA are located in different physical entities, the message sent to the anchor SFA needs to pass through the serving SFA. This applies to the similar contents mentioned below.

Step 303: After receiving the PD-Request, the anchor SFA transfers the request to the Home Policy Flow (H-PF) server. If the UE is roaming, signaling message needs to be transferred through one or more Visited Policy Flow (V-PF) servers.

Step 304: After receiving the PD-Request, the H-PF server decides whether to approve the resource request of the user or not, depending on the user database and the applied service policy. Afterward, the H-PF server returns a PD-Response to the anchor SFA, with the response carrying the result of policy decision and possibly the header compression rule parameter sent by the H-PF server. In the case that the UE is roaming, the signaling message needs to be transferred through one or more V-PF servers.

Step 305: According to the local service policy, the anchor SFA returns a PD-Response to the SFM.

It is understandable that the PD-Request is intended to inquire whether the network side allows creation of the service flow. Omission of this step is allowed in theory, but is seldom seen in the practice. Hereinafter the same applies.

Step 306: The SFM decides whether to grant admission according to the state of the local resources. If admission is granted, the SFM sends an RR-Request message to the anchor SFA, with the message carrying the relevant parameters such as the QoS parameter set and the reservation type parameter required by the RR-Request; otherwise, the SFM returns a DSA-Response to the MS to finish the DSA process.

Step 307: The anchor SFA transfers the received RR-Request to the H-PF server. In the case that the UE is roaming, the signaling message needs to be transferred through one or more V-PF servers. In the process of sending an RR-Request from the SFM to the V/H-PF, the corresponding management resources and service resources are allocated to each node in the network according to the resource reservation requirements. In the resource request process, if the resource reservation for a node fails, all nodes in the network release the allocated resources according to the result carried in the Resource-Response.

Step 308: The resource reservation result and the corresponding parameters are returned through a Resource-Response; the V/H-PF sends the response to the anchor SFA; this response may carry a header compression rule parameter.

Namely, the header compression rule parameter sent by the H-PF may be carried in the PD-Response, or carried in the Resource-Response to be sent to the anchor SFA.

Step 309: After receiving Resource-Response message, the anchor SFA allocates a header compression rule parameter and sends the parameter together with the Resource-Response to the SFM if the Resource-Response message carries no such parameter and the PD-Response received previously carries no such parameter (namely, the PF does not allocate such a parameter).

Now, if the SFM receives a successful Resource-Response, it indicates that the resource is reserved successfully; otherwise, the resource reservation fails.

Step 310: After receiving a Resource-Response, if the resource is reserved successfully, the SFM judges whether to create a data path. If the granularity of the data path is based on service flows, or the data path for bearing the service flow is not created, a data path needs to be created. In this case, the SFM sends a data path setup request to the anchor SFA, with the request carrying the data path description parameter required for setup of the data path. Each node in the network sets up a data path according to the parameter in the request message. If a data path available to the service flow already exists, it is not necessary to create a data path. In this case, the SFM returns a DSA-Response to the MS directly to finish the DSA process. Namely, if the data path is not based on service flows, a data path needs to be created only in the case of creating the first service flow, and no further data paths need to be created for the subsequent service flows. Hereinafter the same applies.

Step 311: If a data path is created, the anchor SFA sends a data path setup response to the SFM; otherwise, the anchor SFA releases the allocated resources.

Step 312: The SFM sends a data path acknowledgement to the anchor SFA after receiving a data path setup response.

Now the data path is created.

Step 313: The SFM decides whether to save the header compression rule parameter according to the conditions, and then returns a DSA-Response to the MS, with the response carrying the DSA result and the header compression rule parameter. The conditions mentioned above are: when the Base Station (BS) needs to handle header compression, the SFM saves the header compression rule parameter; if the BS does not handle header compression, for example, the header compression is handled only at the gateway (GW), the SFM does not save the parameter, but transfers the parameter to the MS.

Step 314: After receiving the DSA-Response, the MS saves the relevant parameters, including the header compression rule parameter. The subsequent service flow handles header compression according to such a rule. Afterward, the MS sends a DSA-ACK to the SFM.

Now, the air interface is created, and the DSA process is finished. The data transmission can begin upon completion of the DSA process.

In the first embodiment, after the policy decision, the resource is reserved, and then a data path is created, and finally the air interface is acknowledged. In the practical application, the previous operation sequence is not mandatory, as further described in the following embodiments.

Embodiment 2: On the basis of the first embodiment, the air interface is acknowledged before a data path is created.

Figure 4:
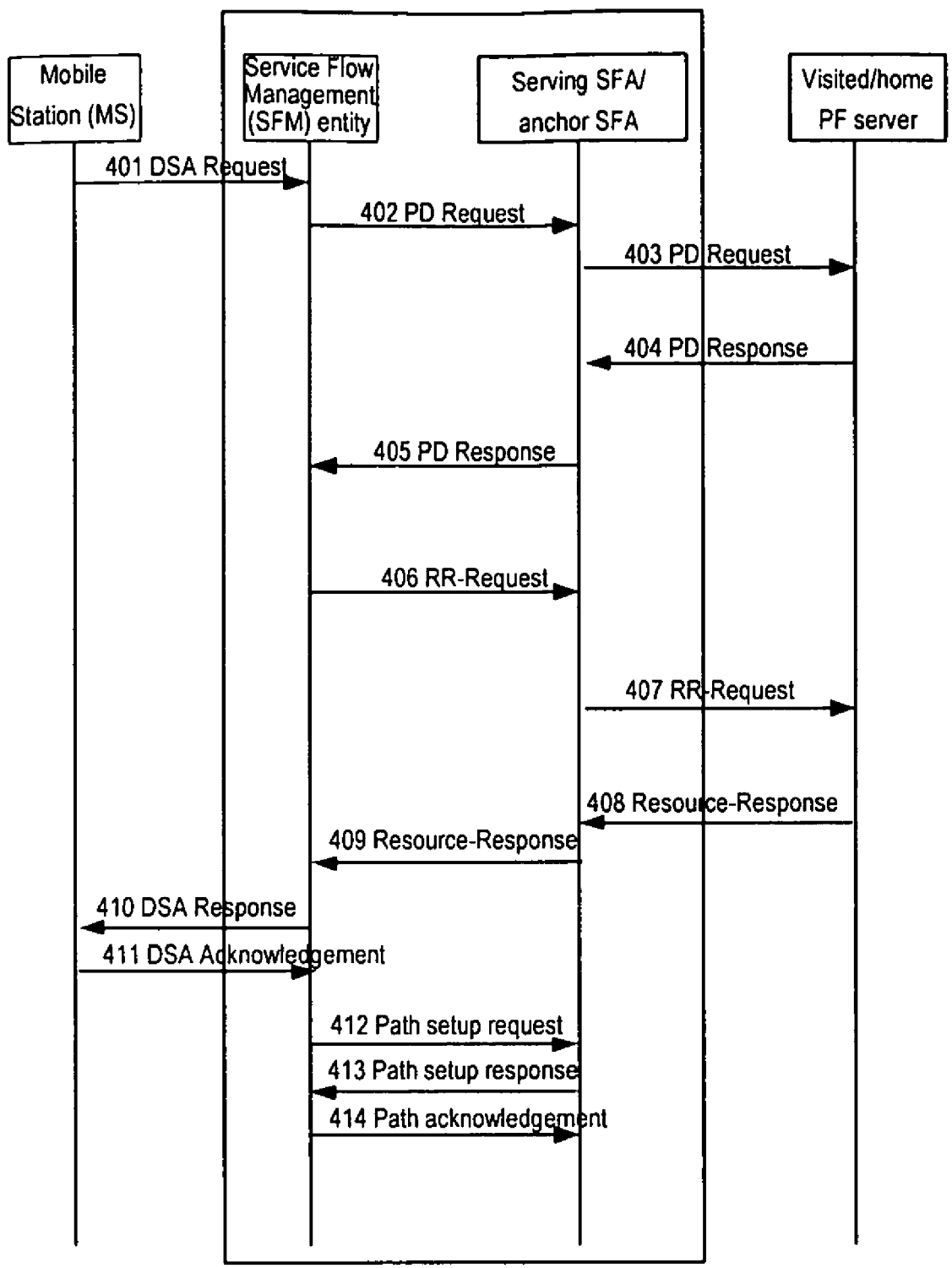
FIG. 4 is a flowchart in mode 2 of creating a dynamic service flow according to an embodiment of the present invention.

As shown in FIG. 4, a Dynamic Service flow Addition (DSA) process includes the steps as described hereinafter.

The operation of step 401~step 409 is the same as step 301~step 309.

Step 410: After receiving a Resource-Response, the SFM sends a DSA-Response to the MS.

Step 411: After receiving the DSA-Response, the MS saves the header compression rule parameter in the response. The subsequent service flow handles header compression according to such a rule. Afterward, the MS sends a DSA-ACK to the SFM.

Now, the air interface creation is acknowledged.

Step 412: After receiving the DSA-ACK, the SFM judges whether to create a data path. If this data path is not based on service flows and bears any other service flow, no further data path is created. Otherwise, the SFM sends a data path setup request to the anchor SFA, with the request carrying the data path description required for setup of a data path. Each node in the network sets up a data path according to the parameter in the request message.

Step 413: The result of data path setup and the corresponding parameter are returned through a data path setup response, which is sent by the anchor SFA to the SFM.

Step 414: The SFM sends a data path acknowledgement to the anchor SFA after receiving a data path setup response.

Now the data path is created.

Embodiment 3: Policy decision, resource reservation and data path setup are implemented concurrently.

Figure 5:
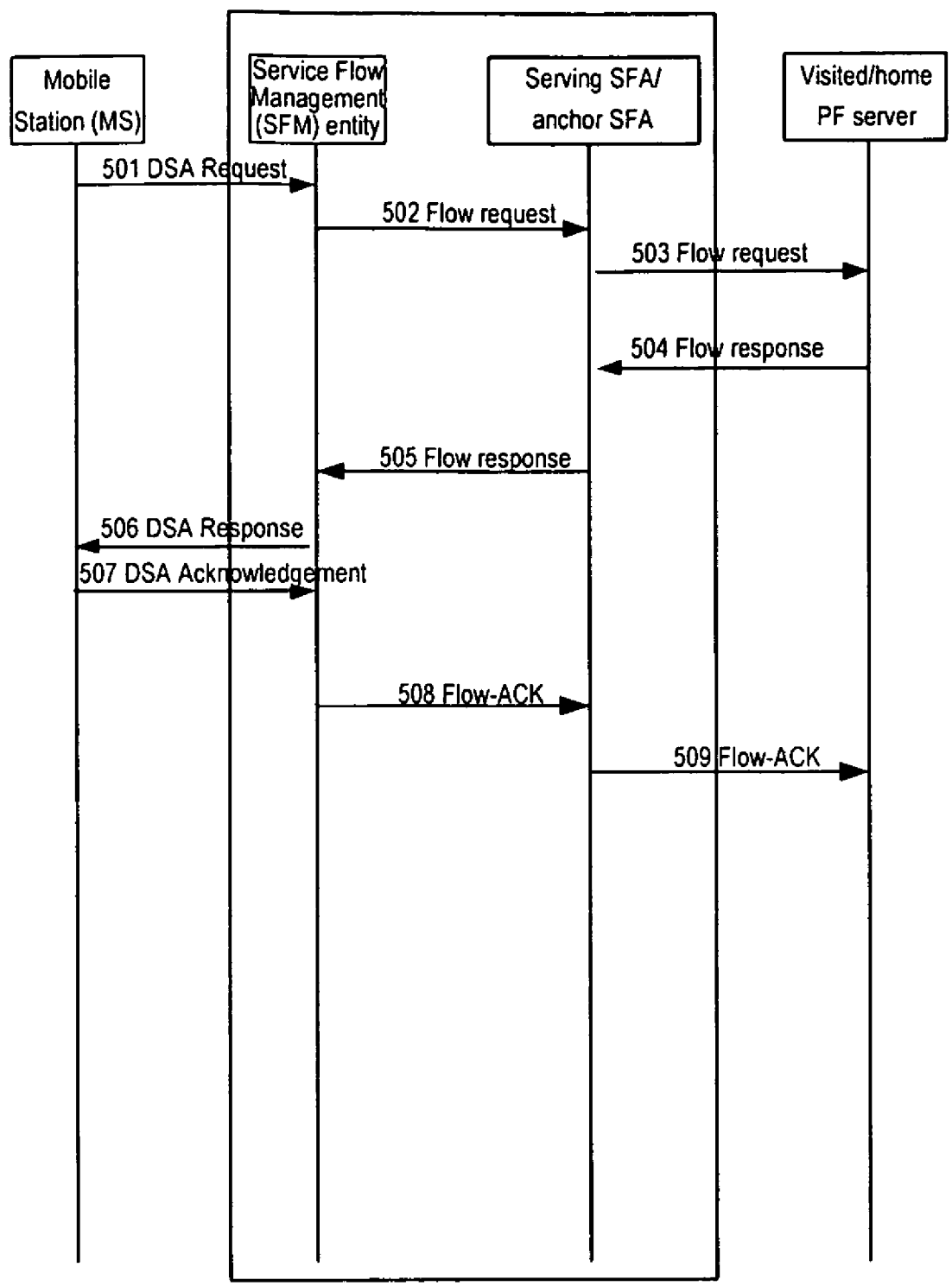
FIG. 5 is a flowchart in mode 3 of creating a dynamic service flow according to an embodiment of the present invention.

As shown in FIG. 5, a Dynamic Service flow Addition (DSA) process includes the steps as described hereinafter.

Step 501: The MS sends a DSA-Request to the SFM.

Alternatively, if the DSA-Request sent by the MS includes a header compression rule parameter, the network side does not allocate any header compression rule parameter to the MS. In the third embodiment, the DSA-Request sent by the MS includes no header compression rule parameter. In other embodiments (including DSA process, DSC process and DSD process), the same applies.

Step 502: After receiving the DSA-Request, the SFM sends the flow request through the serving SFA to the anchor SFA. This flow request carries a policy decision request (PD-Request), a resource reservation request (RR-Request), and a QoS parameter set required by the PD-Request and the RR-Request. If a data path needs to be created, the flow request should also carry the data path description parameter. Namely, the flow request carries the PD-Request parameter, resource processing request parameter, resource processing indication, Path-Request parameter and data path processing indication. If no data path setup process is required, the flow request carries no Path-Request parameter or data path processing indication. A resource processing indication is an indication of adding, changing or deleting a resource; the Path-Request parameter and the data path processing indication are parameters required for data path processing; a data path processing indication is an indication of adding, changing or deleting a data path. In third embodiment, the resource processing indication indicates the operation of adding a service flow, and the data path processing indication also indicates the operation of adding a data path. Besides, the flow request should also include a resource reservation type parameter and/or a header compression rule parameter in addition to the previous contents. In other embodiments (including DSA process, DSC process and DSD process), the same applies.

Step 503: After receiving the flow request, the anchor SFA saves the message about the data path to be created, and sends the policy decision request (PD-Request) and the resource reservation request (RR-Request) and the relevant parameters to the H-PF server through the flow request. In the case that the UE is roaming, the signaling message needs to be transferred through one or more V-PF servers.

Step 504: After receiving the flow request, the H-PF server judges whether to approve the resource request of the user or not, depending on the user database and the applied service policy. Afterward, the H-PF server returns a flow response message to the anchor SFA, with the policy decision result carried in the message.

Step 505: After receiving a flow request message, the anchor SFA applies the local service policy, and decides whether to reserve resources and create a data path (based on the saved data path parameters) according to the PF decision result and the local policy application result. If the message carries no header compression rule parameter, the anchor SFA may allocate a header compression rule parameter, and send the parameter together with RR-Response message to the SFM.

Step 506: After receiving the flow response, the SFM returns a DSA-Response to the MS, and transfers the parameters for resource reservation and data path setup to the MS.

Step 507: After receiving the DSA-Response, the MS saves the header compression rule parameter in the response. The subsequent service flow handles header compression according to such a rule. Afterward, the MS sends a DSA-ACK to the SFM, thus finishing creation of the air interface.

Step 508: After receiving the DSA-ACK, the SFM sends a flow acknowledgement (Flow-ACK) message to the network-side anchor SFA.

Step 509: After receiving the Flow-ACK, the anchor SFA transfers it to the H-PF server directly.

The acknowledgement operation in the previous steps 508~509 may be omitted. Hereinafter the same applies.

Now, the DSA process is completed.

It is understandable that if the execution of a level of network node fails in the previous process of resource reservation or data path setup, the previous DSA-ACK message will lead to release of the resources allocated to the nodes which have executed operation successfully and release of the corresponding data path.

The first embodiment and the second embodiment show that in the DSA process, the Path-Request/response process may occur before or after the air interface response/acknowledgement process. In the first embodiment, the PD request/response process, the resource request/response process and the data path setup request/response process are executed independently. In the third embodiment, in the DSA process, the PD-Request, the RR-Request, and the Path-Request are carried in the flow request. In the message transfer process, the message related to the data path is saved in the anchor SFA, and the parameters related to the PD-Request and the RR-Request are further sent through the flow request message. After receiving the flow response, the anchor SFA sends the flow response together with the Path-Response to the SFM. In this way, the policy decision/response process, the resource request/response process and the data path request/response process are implemented concurrently. The previous embodiments 1, 2 and 3 can be used to infer Embodiment 4 according to the present invention.

Figure 6:
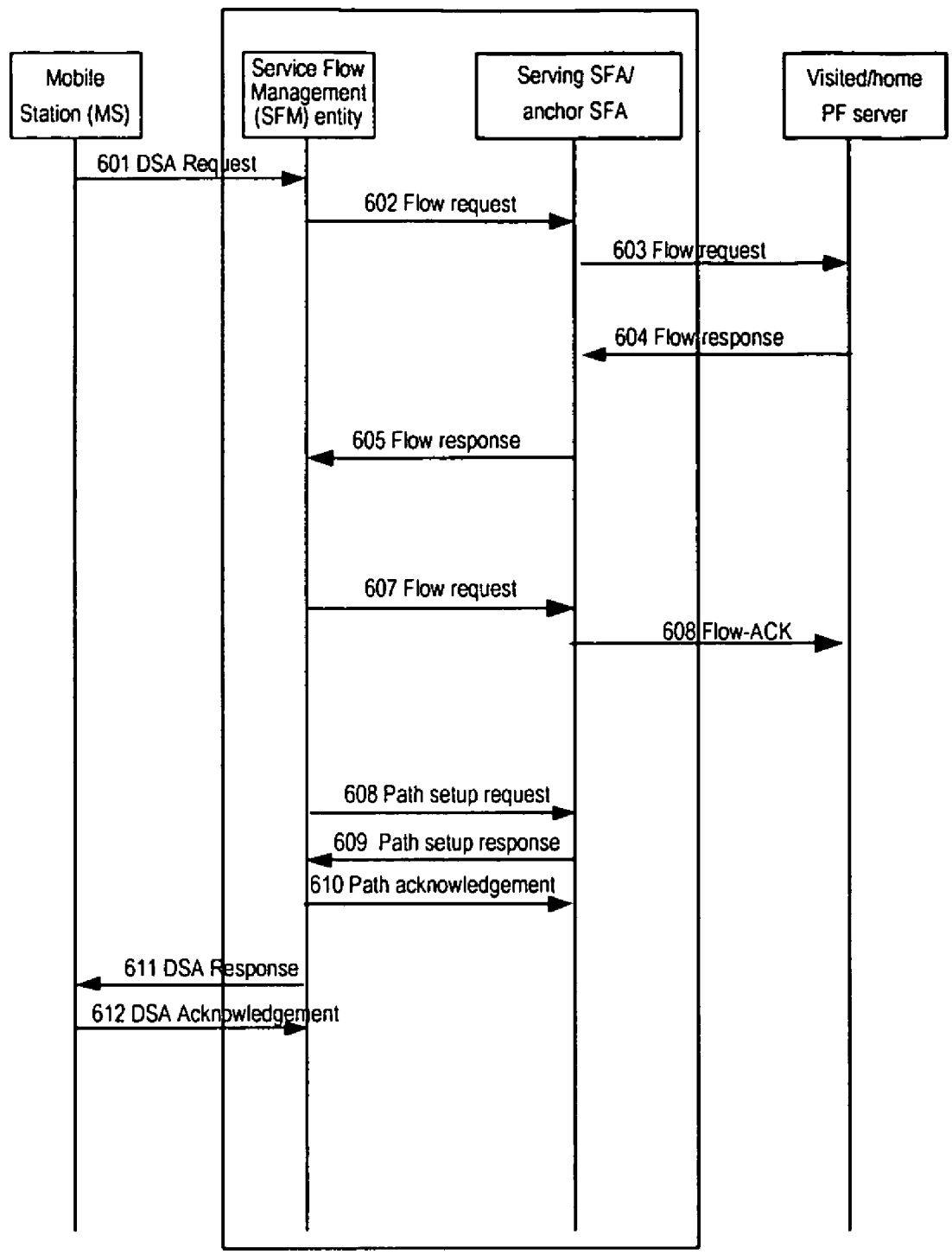
FIG. 6 is a flowchart in mode 4 of creating a dynamic service flow according to an embodiment of the present invention.

Embodiment 4: as shown in FIG. 6, a Dynamic Service flow Addition (DSA) process includes the steps as described hereinafter.

After the MS sends a DSA-Request to the network side, the SFM implements the policy decision request/response process and the resource request/response process concurrently. Afterward, the SFM executes the data path request/response process at discretion, and finally executes the air interface setup response/acknowledgement process.

Figure 7:
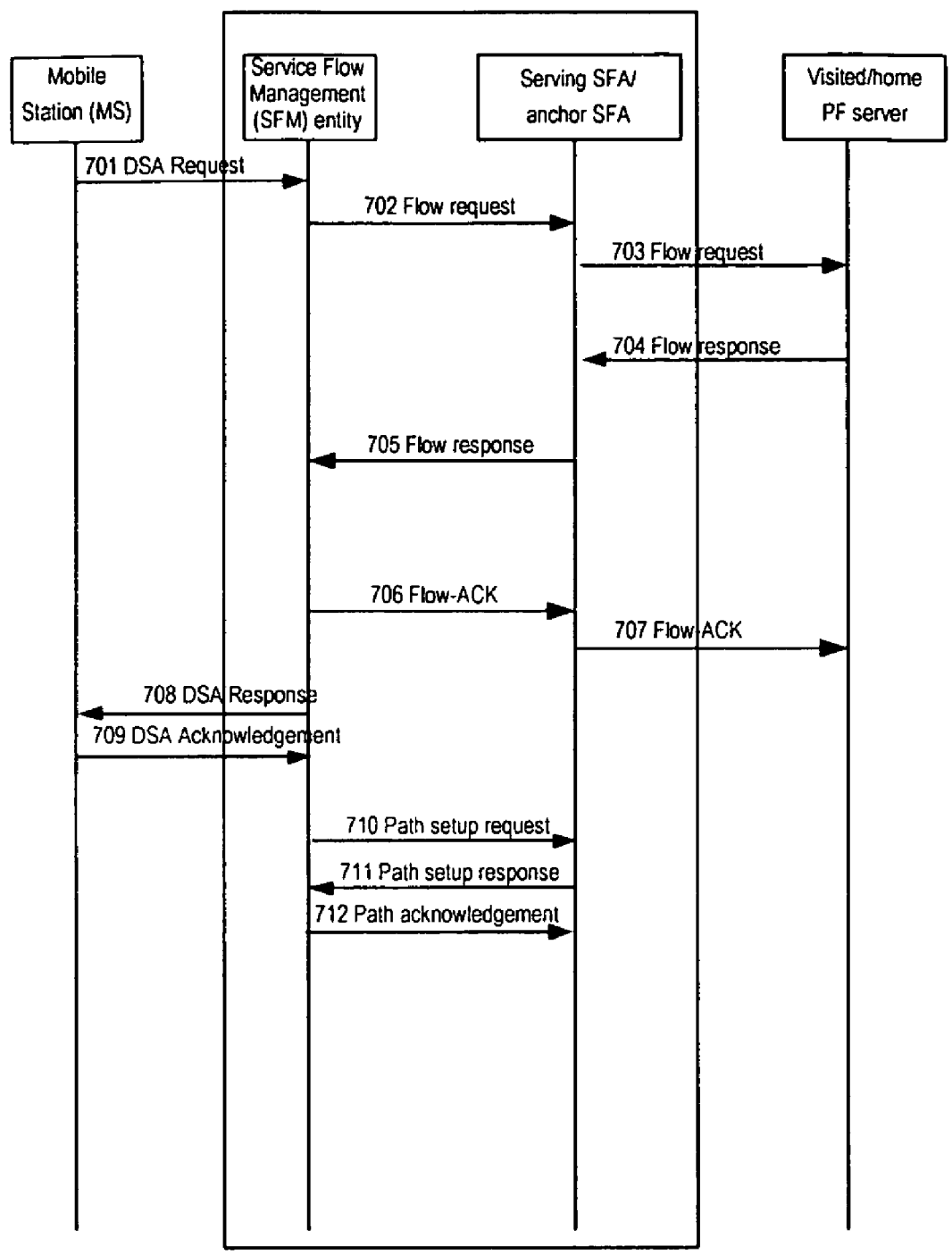
FIG. 7 is a flowchart in mode 5 of creating a dynamic service flow according to an embodiment of the present invention.

Embodiment 5: as shown in FIG. 7, a Dynamic Service flow Addition (DSA) process includes the steps as described hereinafter.

After the MS sends a DSA-Request to the network side, the SFM implements the policy decision request/response process and the resource request/response process concurrently. Afterward, the SFM performs air interface response/acknowledgement, and finally executes the data path request/response process at discretion.

Figure 8:
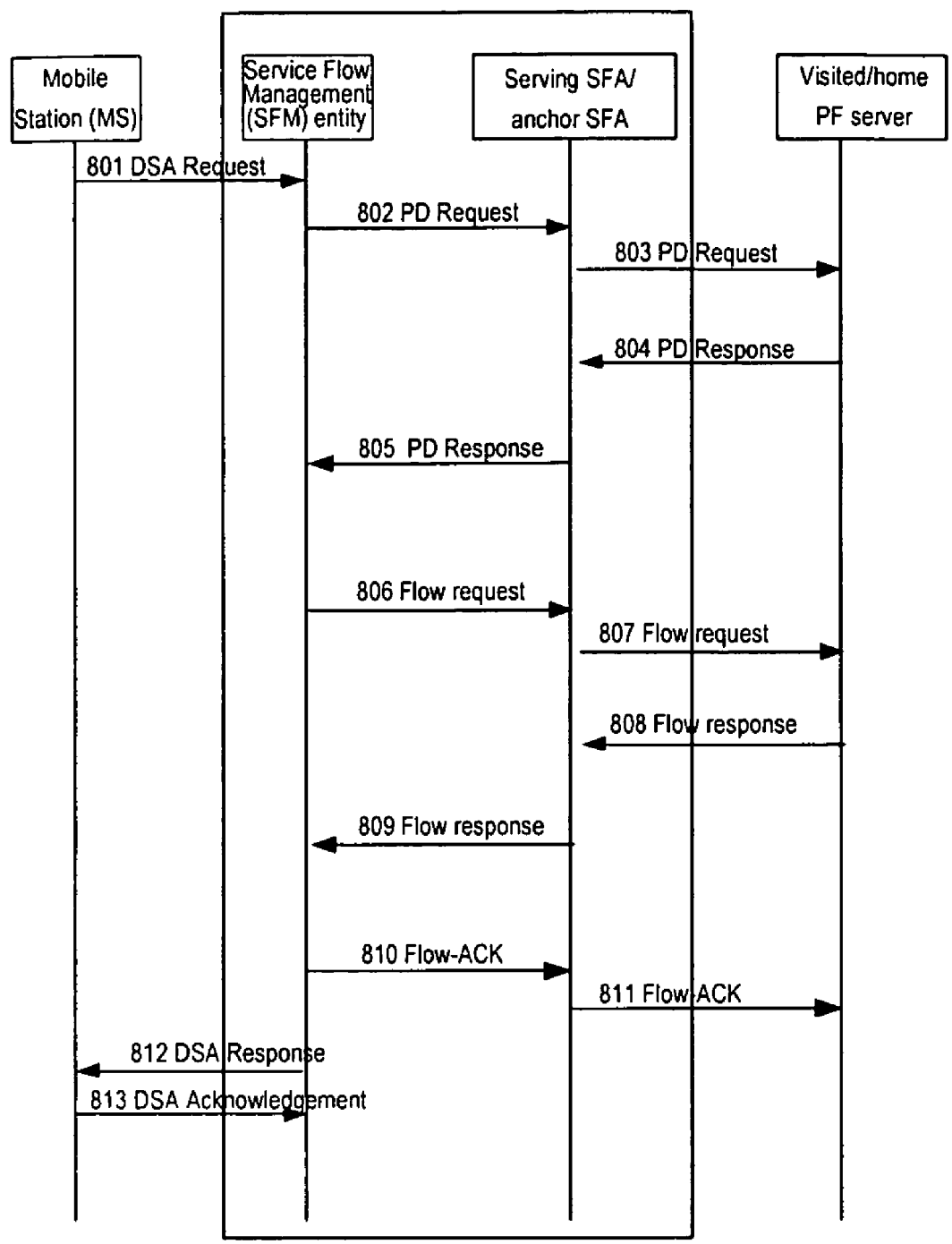
FIG. 8 is a flowchart in mode 6 of creating a dynamic service flow according to an embodiment of the present invention.

Embodiment 6: as shown in FIG. 8, a Dynamic Service flow Addition (DSA) process includes the steps as described hereinafter.

After the MS sends a DSA-Request to the network side, the SFM implements steps 802~805: policy decision request/response process; and then executes steps 806~809 concurrently: resource request/response process and data path request/response process, namely, the flow response carries the parameters required for the resource request process and the path setup process; afterward, the SFM executes steps 810~811: flow acknowledgement process; finally, the SFM executes steps 812~813: air interface response/acknowledgement process.

In the sixth embodiment, steps 810~811 may occur after steps 812~813.

Described below is a Dynamic Service flow Change (DSC) process.

Figure 9:
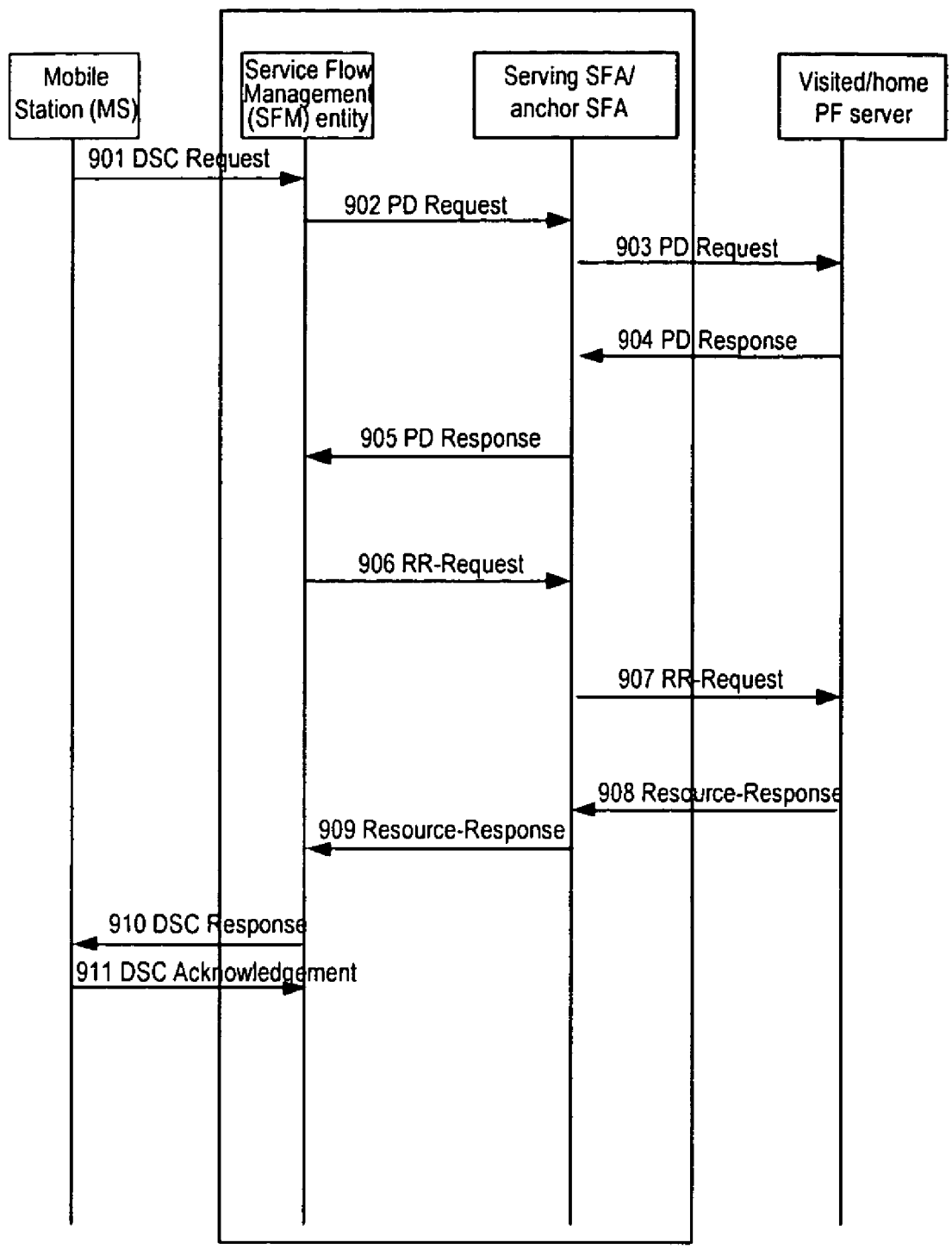
FIG. 9 is a flowchart in mode 1 of changing a dynamic service flow according to an embodiment of the present invention.

Embodiment 7: as shown in FIG. 9, a Dynamic Service flow Change (DSC) process includes the steps as described hereinafter.

Step 901: The MS initiates a DSC-Request to the SFM, and the SFM judges whether to perform a policy decision request/response process according to the set parameters. If any QoS parameter to be changed raises a higher requirement on the network side, a policy decision process needs to be performed before the DSC process to judge whether the network side can provide the service; otherwise, the policy decision process is not required. If a policy decision is required, the procedure goes on; if no policy decision is required, the procedure proceeds to step 906.

Step 902~step 905 are the same as step 302~step 305, except different parameters carried in each step and different functions executed.

Step 906: The SFM decides whether to grant admission according to the state of the local resources. If admission is granted, the SFM sends an RR-Request message to the anchor SFA, with the message carrying the QoS parameter set required by the RR-Request. The message may pass through the serving SFA and one or more relay SFA entities along the path. Otherwise, the SFM returns a DSC-Response to the MS directly, thus finishing the DSC process.

Step 907~step 909 are the same as step 307~step 309, except different parameters carried in each step and different functions executed.

Like FIG. 3, if the H-PF server allocates a header compression rule parameter, the parameter can be carried in the PD-Response or RR-Response and sent to the anchor SFM, and further transferred by the anchor SFM to the SFM; if the PF server does not allocate a header compression rule parameter, the anchor SFA allocates a header compression rule parameter, send the parameter together with the Resource-Response message to the SFM.

Step 910: The SFM returns a DSC-Response to the MS.

Step 911: After receiving the DSC-Response, the MS saves the relevant parameters, including the header compression rule parameter. The subsequent service flow handles header compression according to such a rule. Afterward, the MS sends a DSC-ACK to the SFM, thus finishing change of the air interface.

The comparison between the seventh embodiment and the first embodiment reveals that a DSC process differs from a DSA process in the request command sent by the MS to the network side, which leads to different message parameters. However, the procedure is the same except that the path request/response process is not mandatory in the DSC process.

As inferred from the above conclusion, like the second embodiment, a DSC process may be implemented in Embodiment 8 according to the present invention.

Figure 10:
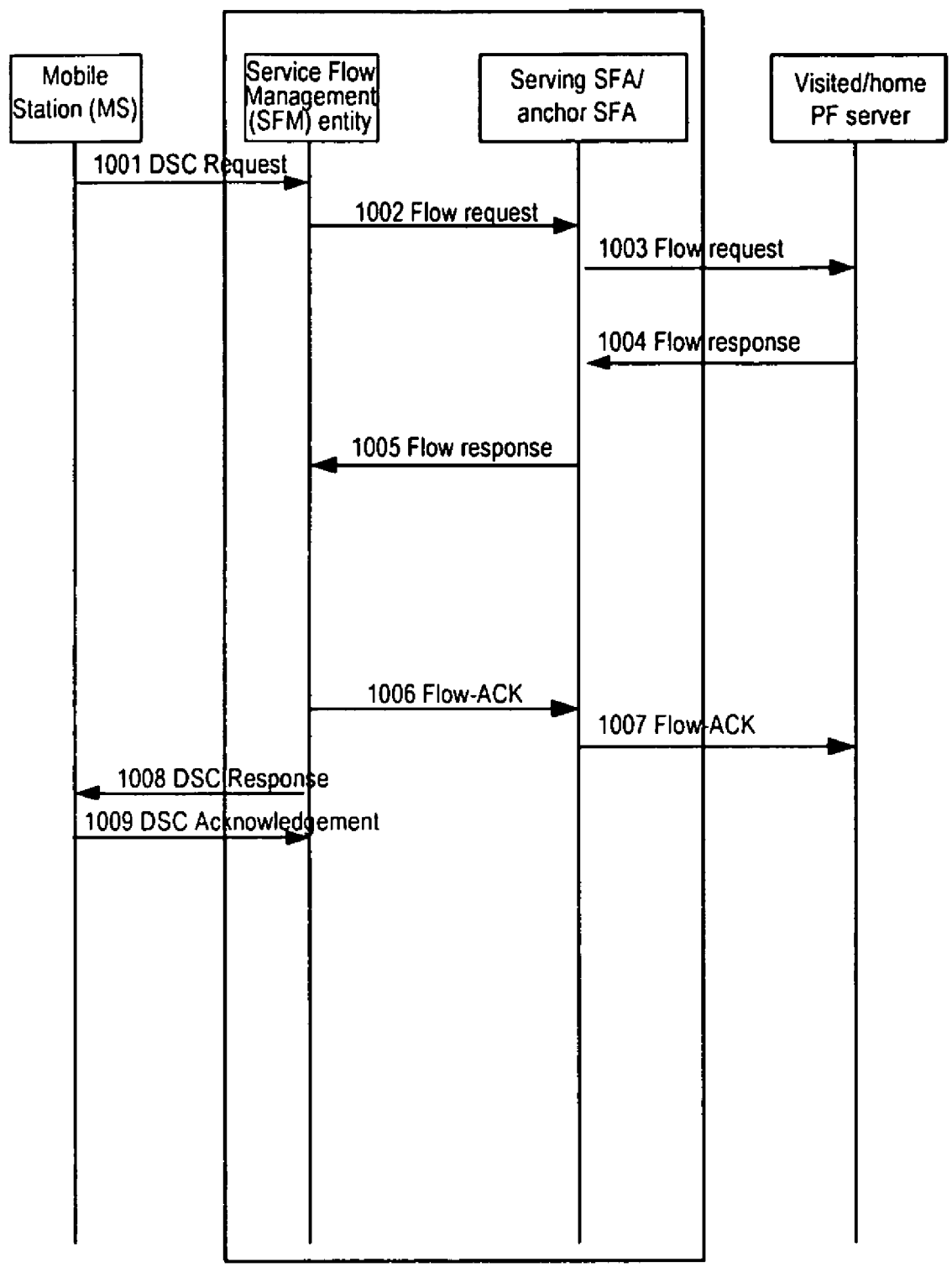
FIG. 10 is a flowchart in mode 2 of changing a dynamic service flow according to an embodiment of the present invention.

Embodiment 8: as shown in FIG. 10, a Dynamic Service flow Change (DSC) process includes:

the MS initiates a DSC-Request to the SFM, and the SFM judges whether to perform a policy decision request/response process according to the set parameters. If necessary, a policy decision request/response process is performed at the same time of executing the resource request/response process. Namely, the flow request message carries the parameters required for policy decision and resource request. Afterward, the air interface response/acknowledge process is performed. If no policy decision request/response process is required, only the resource request/response process is performed, which is followed by the air interface response/acknowledgement process.

As shown in FIG. 8, in the eighth embodiment, step 1006~step 1007 may be executed before or after step 1008~step 1009.

Described below is a Dynamic Service flow Deletion (DSD) process.

Figure 11:
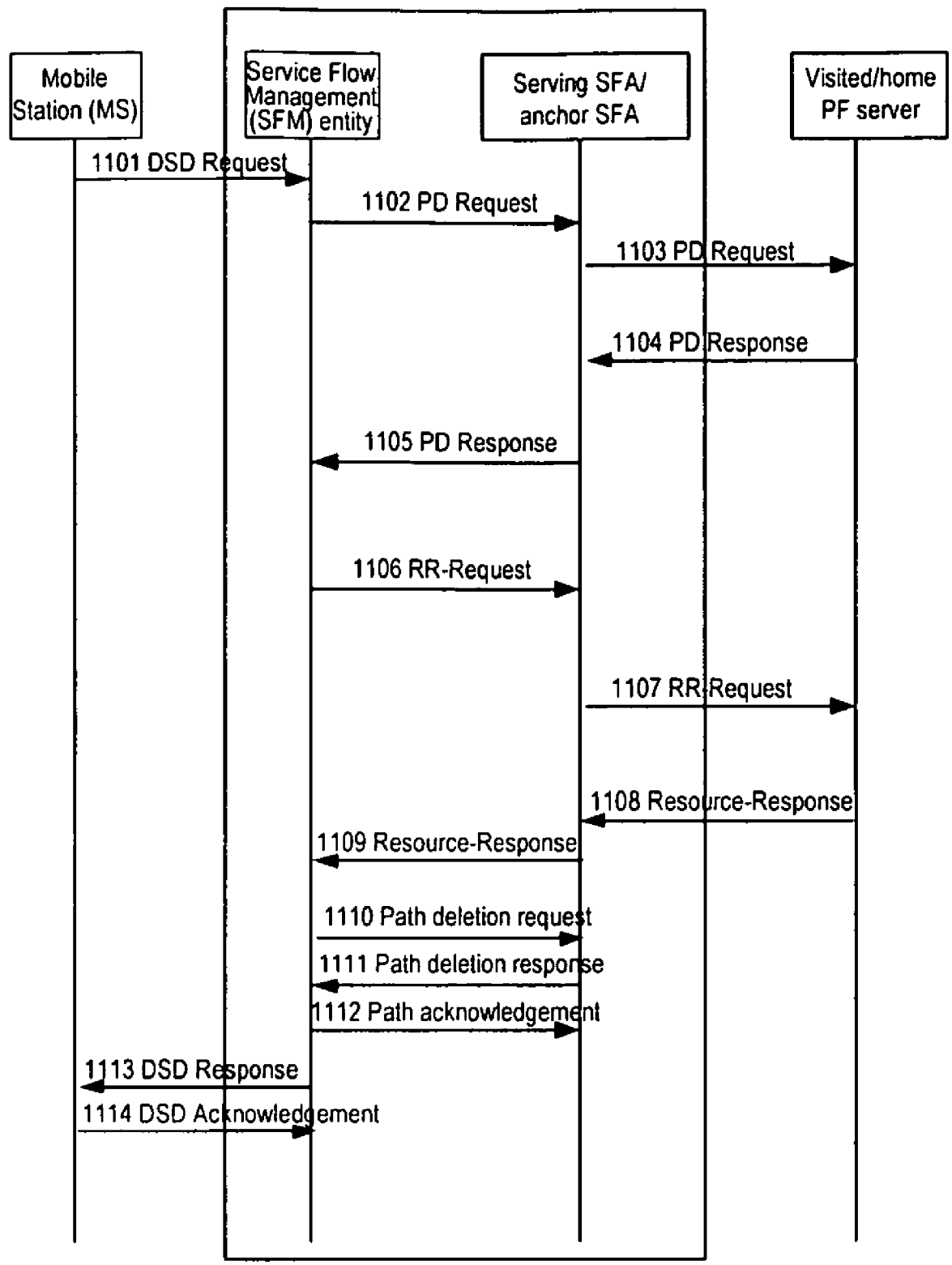
FIG. 11 is a flowchart in mode 1 of deleting a dynamic service flow according to an embodiment of the present invention.

Embodiment 9: as shown in FIG. 11, a DSD process includes the steps as described hereinafter.

Step 1101: An MS sends a DSD-Request to the SFM entity.

Step 1102: after receiving a DSD-Request, the SFM makes a judgment according to the conditions. If the service flow is created by the network side, the SFM sends a PD-Request to the anchor SFA; otherwise, the SFM sends an RR-Request. If the SFM sends an RR-Request, the procedure starts from step 1107.

Step 1103~step 1105 are the same as step 303~step 305 except the parameters carried in each step and the actions executed. For example, in step 303~step 305, the DSA-related parameters are carried in order to help the network side decide whether to allow creation of the dynamic service flow; in step 1103~step 1105 here, the DSD-related parameters are carried in order to help the network side decide whether to allow deletion of the dynamic service flow.

Step 1106: The SFM decides whether to grant admission according to the state of the local resources. If admission is granted, the SFM sends an RR-Request message to the anchor SFA, with the message carrying the QoS parameter set required by the RR-Request; otherwise, the SFM returns a DSD-Response to the MS to finish the DSD process.

Step 1107~step 1109 are the same as step 307~step 309, except different parameters carried in each step and different functions executed.

Step 1110: After receiving an RR-Request, if the resource is requested successfully, the SFM judges whether to delete the data path. If the data path is not based on service flows and bears any other service flow, the data path is not deleted, and the SFM returns a DSD-Response to the MS directly to finish the DSD process; otherwise, the SFM sends a path deletion request to the anchor SFA. Each node in the network deletes the data path according to the parameter in the request.

Step 1111: The result of data path deletion and the corresponding parameter are returned through a data path deletion response, which is sent by the anchor SFA to the SFM. Now, the data path is deleted.

Step 1112: After receiving a data path deletion response, the SFM sends a data path acknowledgement to the anchor SFA. Now, the data path is deleted successfully.

Step 1113: The SFM returns a DSD-Response to the MS, with the deletion result carried in the response.

Step 1114: After receiving the DSD-Response, the MS saves the relevant parameters, including the header compression rule parameter. Afterward, the MS sends a DSD-ACK to the SFM, thus finishing release of the air interface.

The comparison between the ninth embodiment and the first embodiment reveals that a DSD process differs from a DSA process in the request command sent by the MS to the network side, which leads to different message parameters. However, the procedure is the same.

As inferred from the embodiment 2~embodiment 5, a DSD process may be implemented in Embodiment 10 according to the present invention.

Figure 12:
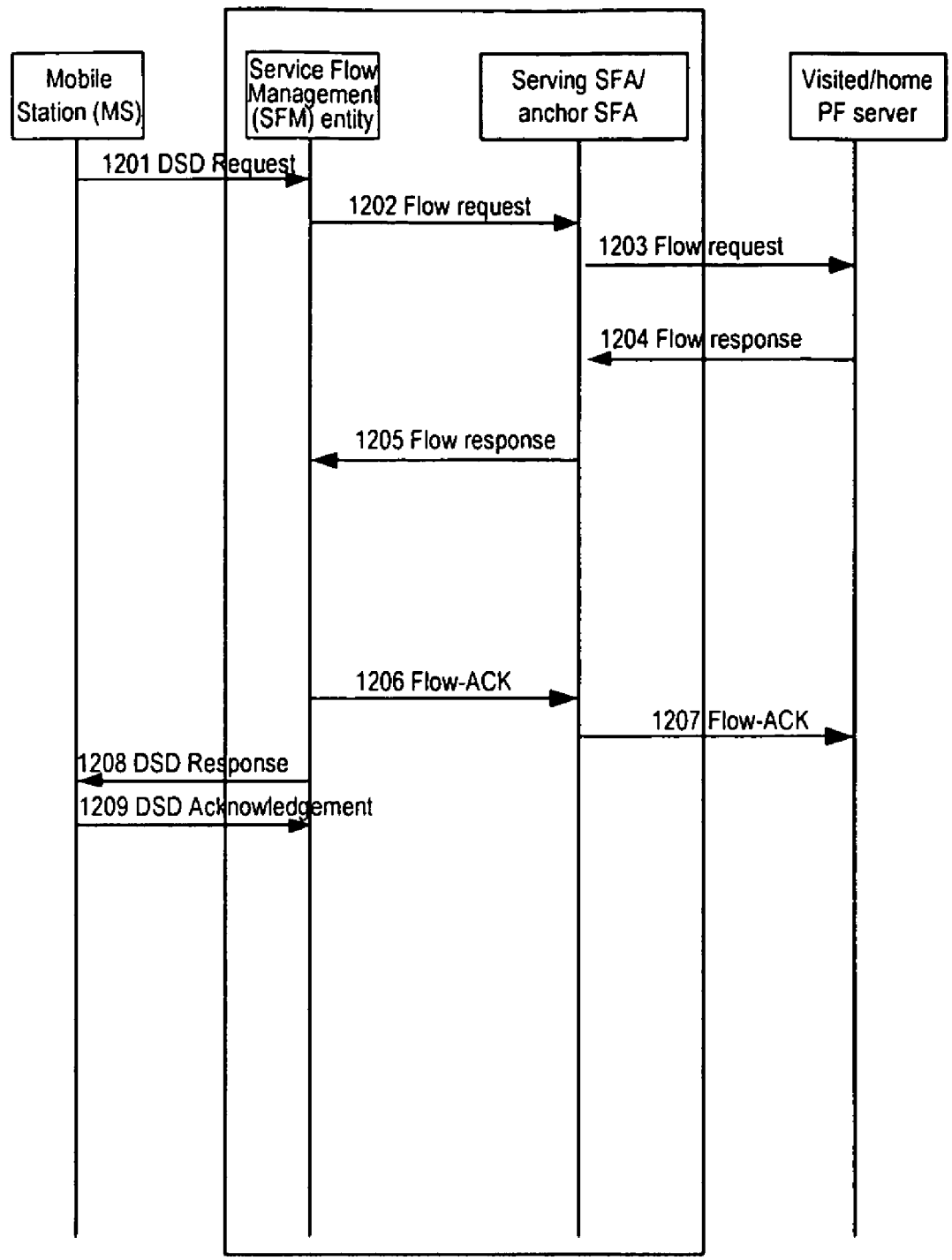
FIG. 12 is a flowchart in mode 2 of deleting a dynamic service flow according to an embodiment of the present invention.

Embodiment 10: as shown in FIG. 12, a DSD process includes the steps as described hereinafter.

After the MS sends a DSD-Request to the network side, the SFM judges whether to execute a policy decision request/response process and a data path request/response process or not, depending on the set parameters. If such processes are required, the SFM executes the policy decision request/response process, the data path request/response process and the resource request/response process concurrently to release the data path and resources. "Concurrently" here means the flow request message carries the parameters required for policy decision, path deletion and resource request. If such processes are not required, the SFM executes only the resource request/response process to release the resources. Finally, the air interface response/acknowledgement process is performed to release the air interface.

As shown in FIG. 12, in the tenth embodiment, step 1206~step 1207 may be executed before or after step 1208~step 1209.

Figure 13:
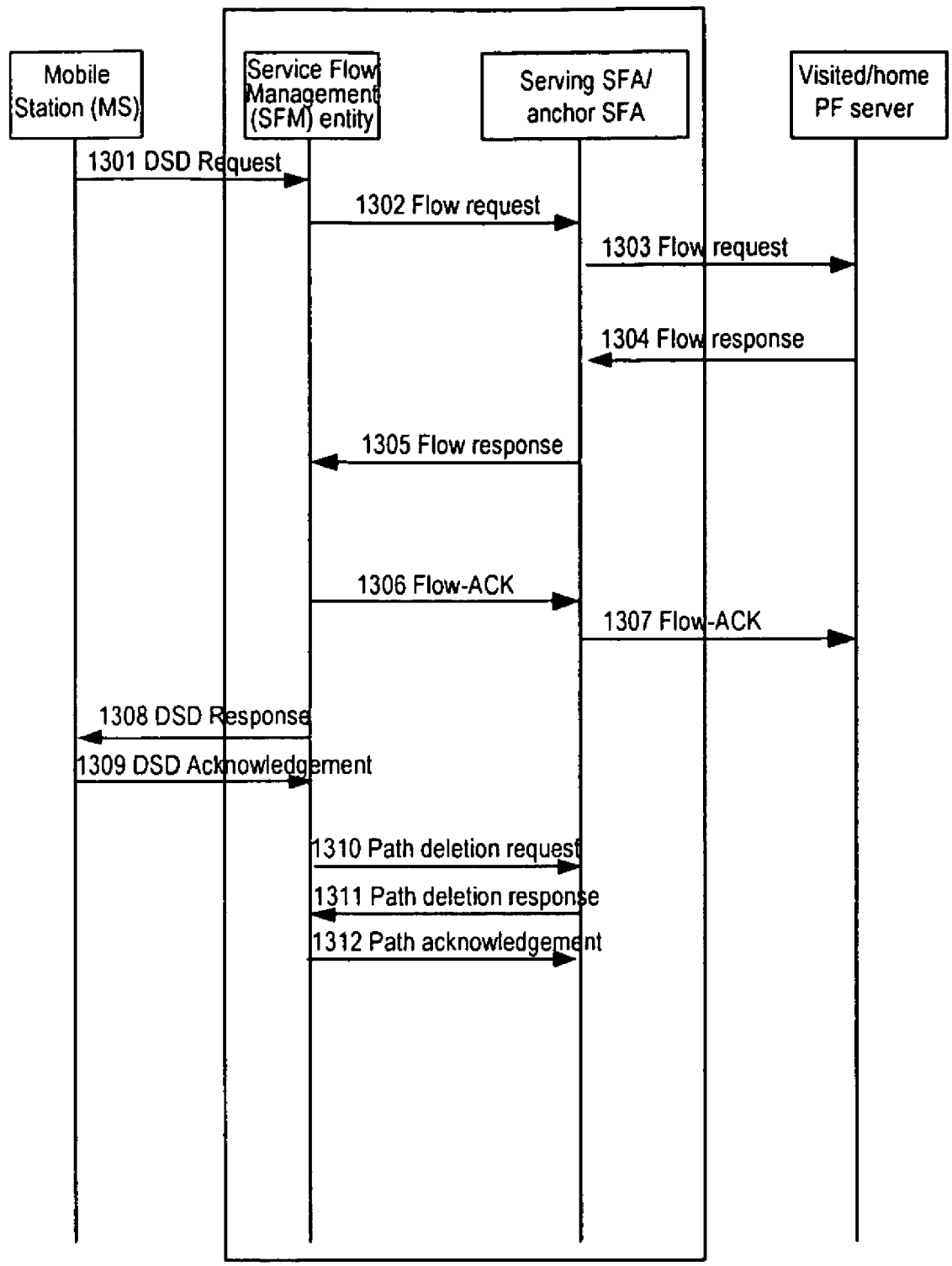
FIG. 13 is a flowchart in mode 3 of deleting a dynamic service flow according to an embodiment of the present invention.

Embodiment 11: as shown in FIG. 13, a DSD process includes the steps as described hereinafter.

After the MS sends a DSD-Request to the network side, the SFM judges whether to execute a policy decision request/response process and a resource request/response process or not, depending on the set parameters. If the policy decision process is required, the SFM executes the policy decision request/response process and the resource request/response process concurrently; if the policy decision process is not required, the SFM executes only the resource request process. After receiving the RR-Request message, each network entity releases the corresponding resources according to the parameters in the message. After completion of the resource request process, the air interface response/acknowledgement process is performed to release the air interface. Finally, if a data path needs to be released, the data path is deleted in the data path request/response process.

Figure 14:
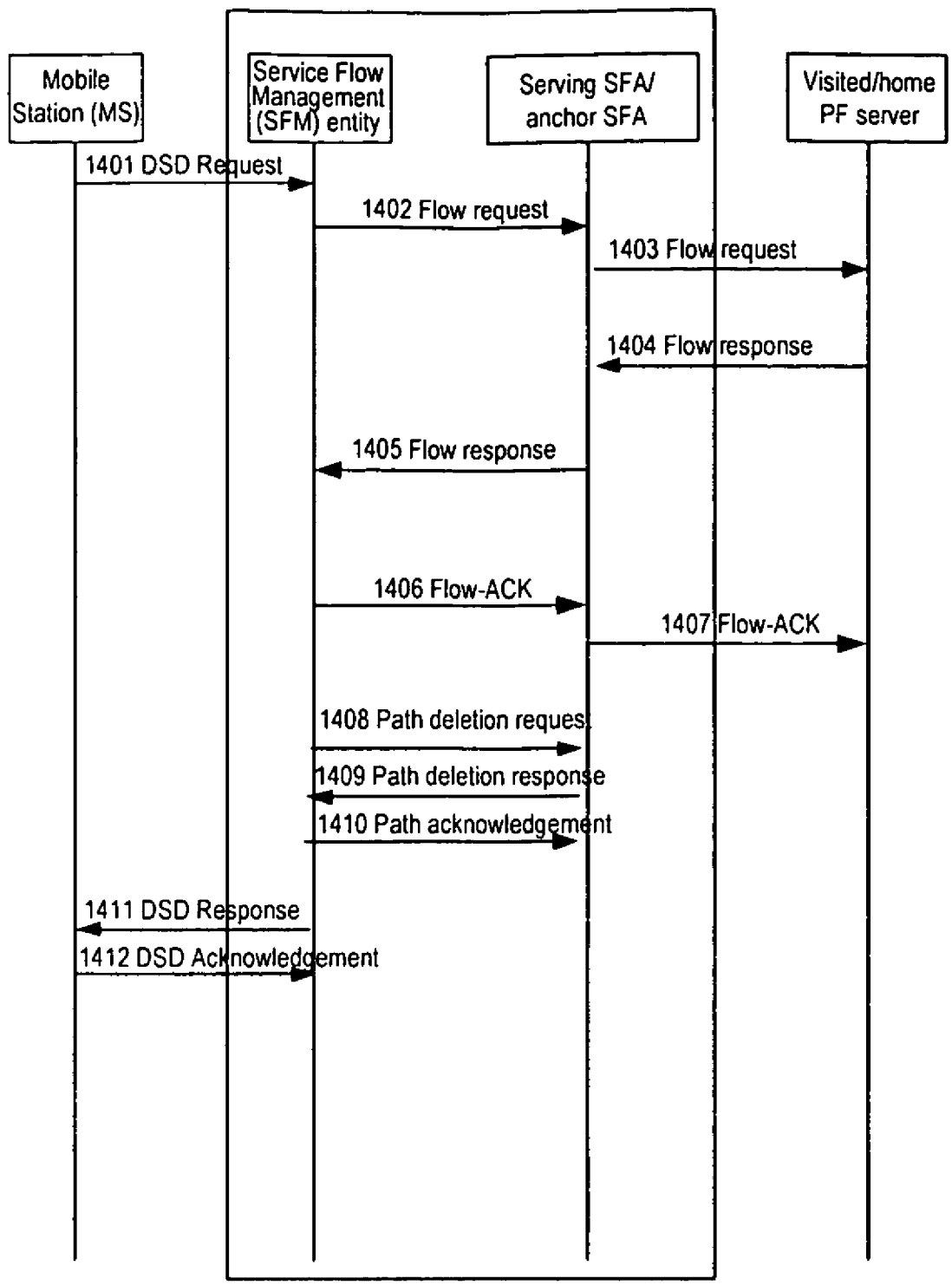
FIG. 14 is a flowchart in mode 4 of deleting a dynamic service flow according to an embodiment of the present invention.

Embodiment 12: as shown in FIG. 14, a DSD process includes:

after the MS sends a DSD-Request to the network side, the SFM judges whether to execute a policy decision request/response process and a data path request/response process or not, depending on the set parameters. If the policy decision process is required, the SFM executes the policy decision request/response process and the resource request/response process concurrently; if the policy decision process is not required, the SFM executes only the resource request process. After receiving the RR-Request message, each network entity releases the corresponding resources according to the parameters in the message. After completion of the resource request process, the data path request/response process is executed at discretion to delete the data path. Finally, the air interface deletion response/acknowledgement process is performed to delete the air interface.

Figure 15:
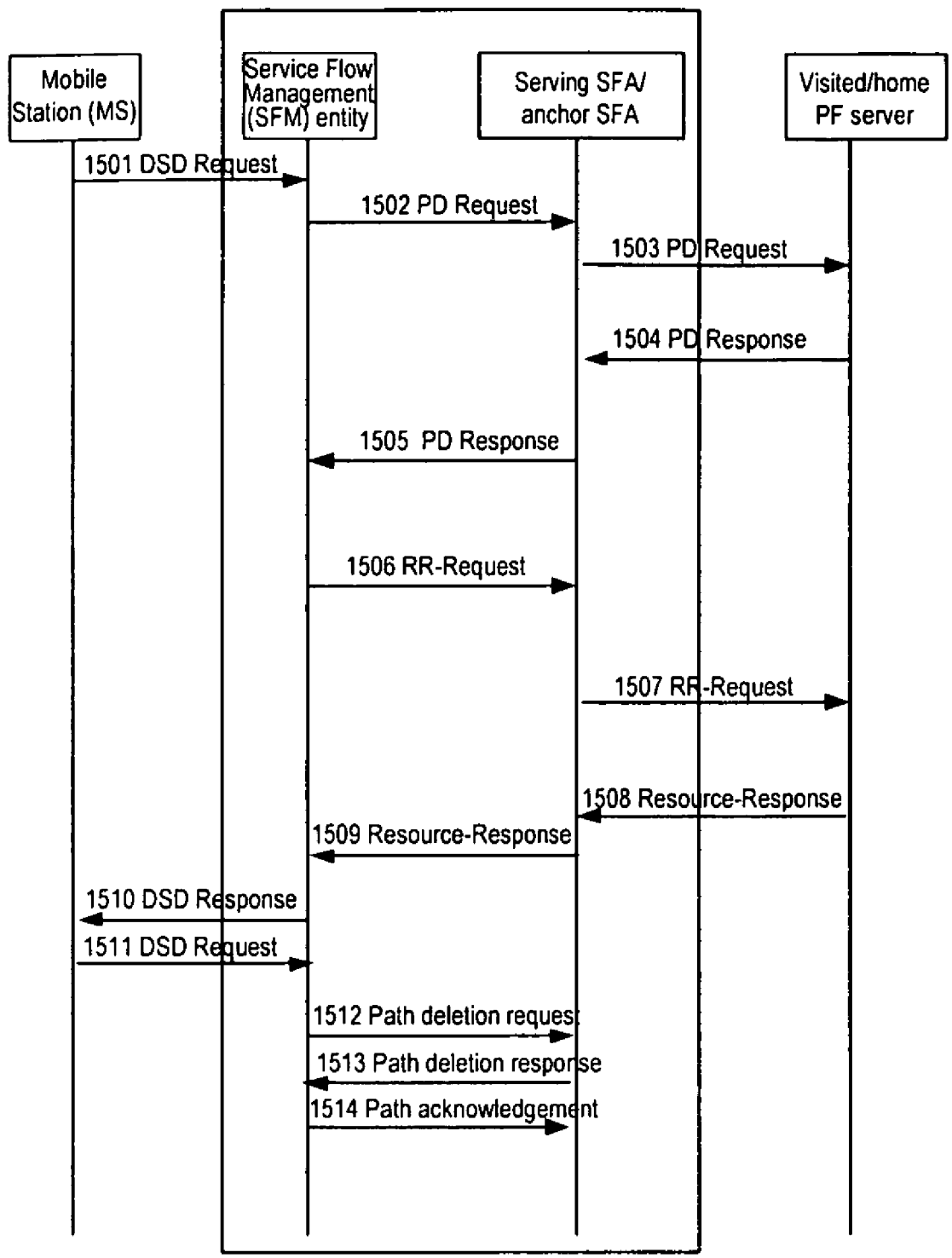
FIG. 15 is a flowchart in mode 5 of deleting a dynamic service flow according to an embodiment of the present invention.

Embodiment 13: as shown in FIG. 15, a DSD process includes the steps as described hereinafter.

After the MS sends a DSD-Request to the network side, the network side implements the policy decision request/response process and the resource request/response process consecutively to release resources. Afterward, the SFM executes the air interface response/acknowledgement process to delete the air interface. Finally, the SFM judges whether to execute a data path deletion process or not, depending on the parameters saved in the data path setup process. If a data path deletion process is required, the SFM executes the data path deletion response/acknowledgement process to complete the data path deletion acknowledgement.

Figure 16:
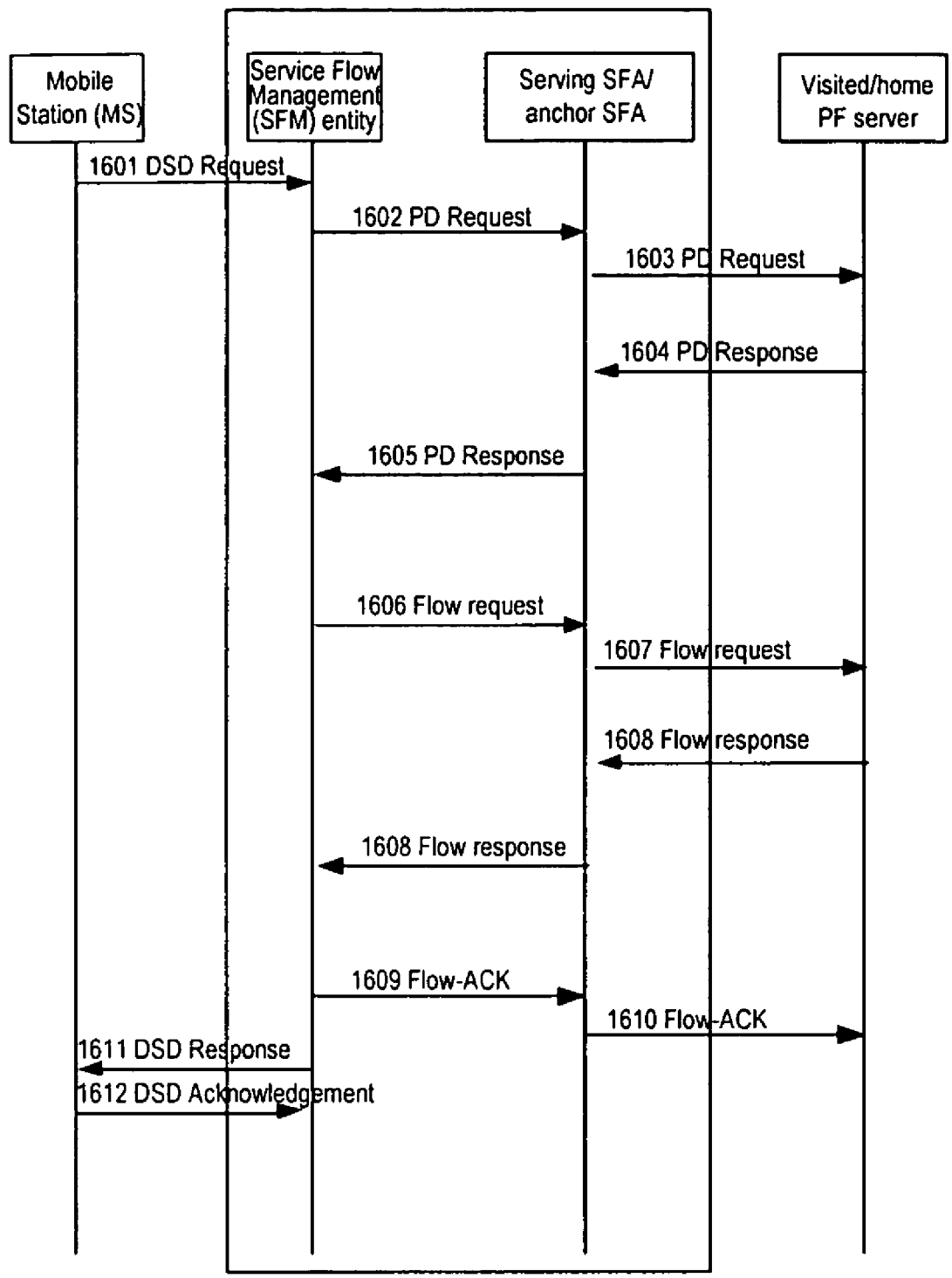
FIG. 16 is a flowchart in mode 6 of deleting a dynamic service flow according to an embodiment of the present invention.

Embodiment 14: as shown in FIG. 16, a DSD process includes:

after the MS sends a DSD-Request to the network side, the SFM judges whether to execute a policy decision process and a data path process or not, depending on the set parameters. If a policy decision process is required, the SFM executes the policy decision process first; if no policy decision process is required, the procedure proceeds to the next step. Afterward, the SFM judges whether to execute a path deletion process or not, depending on the saved parameters. If a path deletion process is required, the SFM executes the resource request process and the data path process concurrently to release the resources and delete the data path; if no path deletion process is required, the SFM executes only a resource request process to release the resources. Finally, the SFM performs an air interface acknowledgement process.

It is understandable that the DSA process, the DSC process and the DSD process are rather similar and can be collectively called a "dynamic service flow processing process". Moreover, in the practical application, the messages applied to such processes are almost the same, except the parameters carried in the messages. For example, when an MS sends a dynamic service flow processing request carrying a processing indication, the SFM can identify the type of the processing request according to the content of the processing indication such as DSA, DSC and DSD. Other aspects are similar.

The processes of creating, deleting and changing a network-side service flow according to an embodiment of the present invention are detailed thereinafter.

Figure 17A:
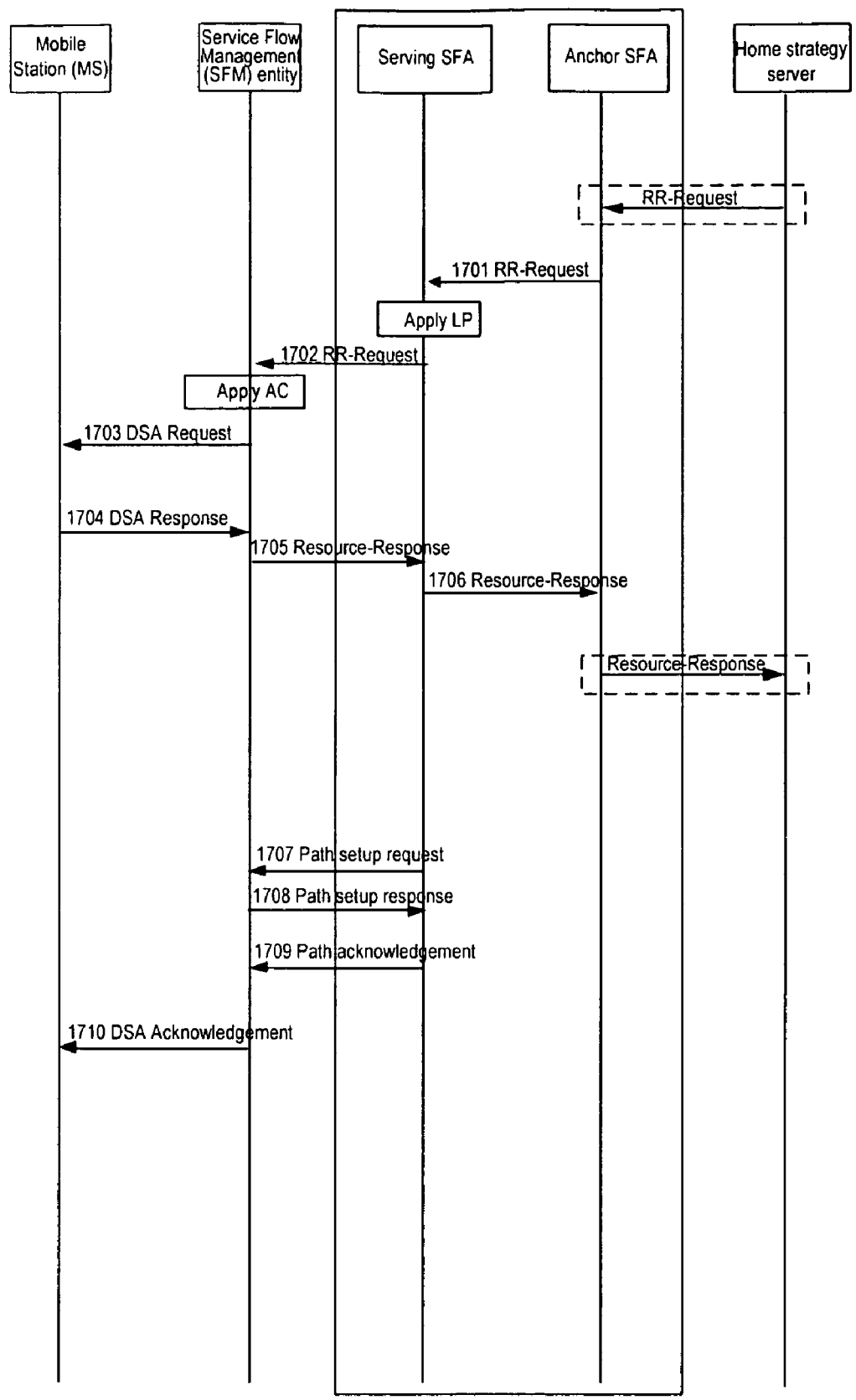
FIG. 17a is an uplink service flowchart in mode 1 of creating a network-side service flow according to an embodiment of the present invention.
Figure 17B:
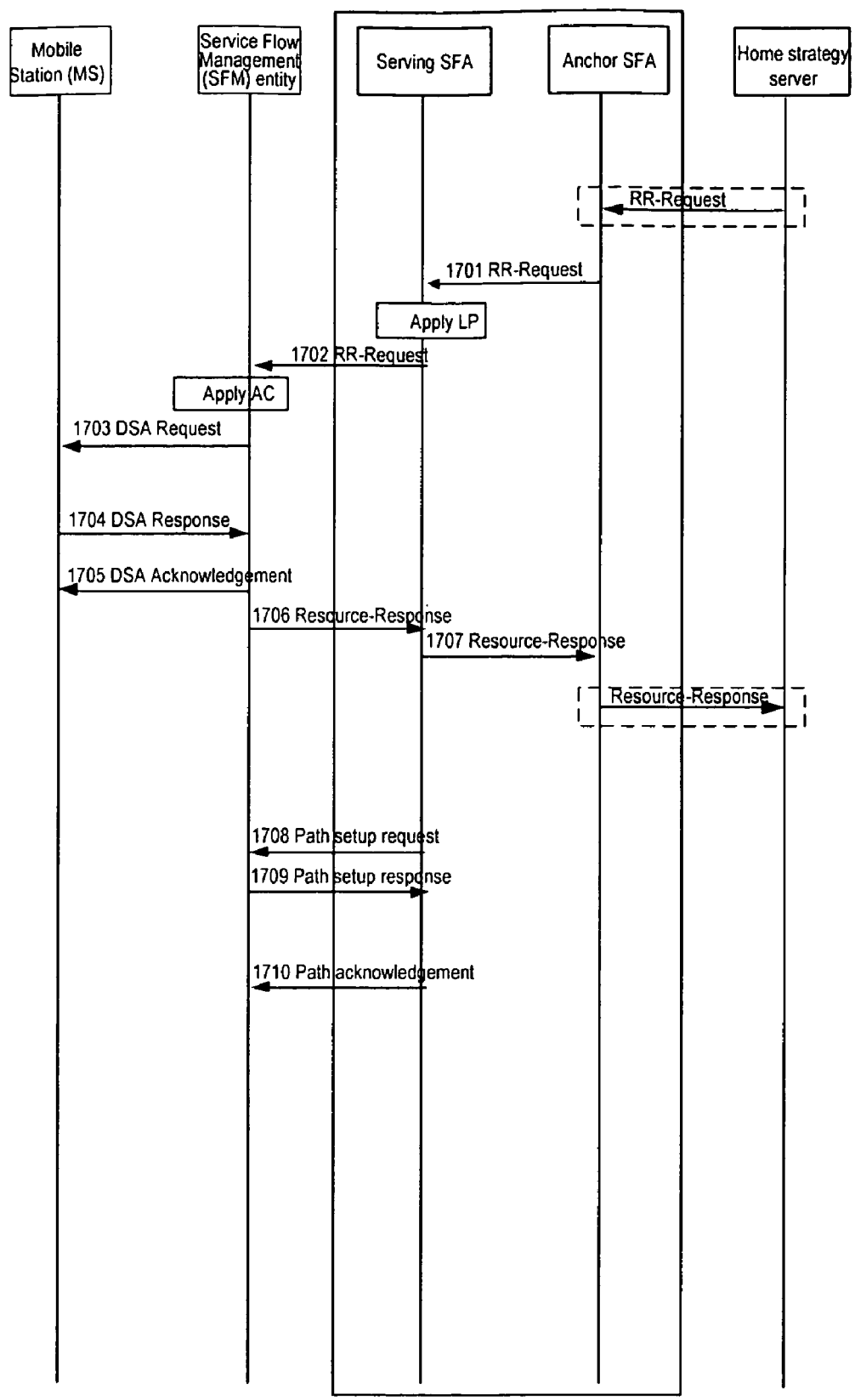
FIG. 17b is a downlink service flowchart in mode 1 of creating a network-side service flow according to an embodiment of the present invention.

Embodiment 15: The fifth embodiment decides the sequence of setting up the R1 interface and the R6 interface according to the direction of the service flow to be created. If the service flow is uplink, the R6 interface is created before R1, as shown in FIG. 17a; if the service flow is downlink, the R1 interface is created before R6, as shown in FIG. 17b.

Taking FIG. 17a as an example, a network-side Dynamic Service flow Addition (DSA) process includes the steps as described hereinafter.

Step 1701: After the anchor SFA is registered on the MS to access the network, the network side initiates a Dynamic Service flow Addition (DSA) process. The network-side DSA process is triggered if the network side sends a RR-Request to the anchor SFA through a V/H PF server or the anchor SFA decides to create a service flow at its discretion. After the network-side DSA is triggered, a service flow request is sent to the anchor SFA through a V/H-PF server, or sent by the anchor SFA directly. The anchor SFA applies the local policy and sends a service flow request message to the SFM, with the message carrying the QoS parameter set of the RR-Request, the header compression rule parameter, the resource reservation type parameter and the request information. If the service flow request is sent from the V/H-PF server, such parameters are sent from the PF server, and the anchor SFA saves the corresponding parameters.

Step 1702: After receiving the RR-Request message, the serving SFA judges whether to approve the resource request or not, depending on the application service policy. If the resource request is rejected, the serving SFA returns a Resource-Response message to the anchor SFA, with the failure result carried in the message, thus finishing the DSA process; if the resource request is approved, the serving SFA reserves the resources according to the parameters in the RR-Request message, and saves the corresponding parameters. Afterward, the serving SFA sends a RR-Request message to the SFM.

It is understandable that the serving SFA and the anchor SFA may be located in the same physical entity or in different physical entities. If the serving SFA and the anchor SFA are located in the same physical entity, the serving SFA and the anchor SFA are the same logic entity; if the serving SFA and the anchor SFA are located in different physical entities, all the messages sent to the serving SFA need to pass through the anchor SFA. This applies to the similar contents mentioned below.

Step 1703: After receiving a RR-Request message, the SFA applies the local policy and sends a DSA-Request message to the MS, with the message carrying the QoS parameter set, the header compression rule parameter and the resource reservation type parameter. The MS saves the corresponding parameters.

Step 1704: After receiving the DSA-Request, the MS saves the corresponding QoS parameters, SFID, CID and the header compression rule parameter, and returns a DSA-Response message to the SFM, with the DSA result carried in the message.

Step 1705: In this embodiment, the sequence of setting up the R1 interface and the R6 interface is decided according to the direction of the service flow to be created. Therefore, after receiving a DSA-Response, the SFM needs to make a judgment: if the service flow to be created is downlink, the SFM sends a DSA-ACK message to the MS directly to finish creating an air interface, as shown in FIG. 17b; and then the SFM sends a Resource-Response to the network side. If the service flow to be created is uplink, the SFM sends a Resource-Response message to the serving SFA at the network side directly, with the resource request result carried in the message, as shown in FIG. 17a.

The content of a step in FIG. 17a is the same as the content of the counterpart step in FIG. 17b, except that the sequence of executing the steps is a little different. Therefore, the following description takes FIG. 17a as an example.

Step 1706: The serving SFA returns a Resource-Response message to the anchor SFA, with the resource result carried in the message. After the anchor SFA receives the Resource-Response, if the service flow request is sent by the V/H-PF server, the anchor SFA needs to send the Resource-Response message to the V/H-PF server, with the message carrying the resource request result and the corresponding parameters.

Step 1707: The serving SFA judges whether the data path is based on service flows, or whether the data path is not created. If so, the serving SFA initiate a path setup process to the SFM, namely, the serving SFA transfers the path setup request message to the SFM, with the path-related information carried in the message; if not, the serving SFA needs to judge whether the service flow is uplink or not. If the service flow is uplink, the serving SFA sends a DSA-ACK to the MS to finish creating the R1 interface.

Step 1708: After receiving the path setup request, the SFM return a path setup response message to the serving SFA, with the path setup result carried in the message.

Step 1709: The serving SFA sends a path acknowledgement to the SFM. Now, the R6 interface data path is created successfully.

Step 1710: The R6 interface creation is completed after the SFM receives a path acknowledgement. If the service flow is uplink, the SFM needs to send a DSA-ACK message to the MS to create an R1 interface.

It is evident that the resource request/response process, the data path setup request/response process and the air interface acknowledgement processes described above are executed independently.

The acknowledgement operation after making a response in the previous embodiment may be omitted. Hereinafter the same applies.

Figure 18:
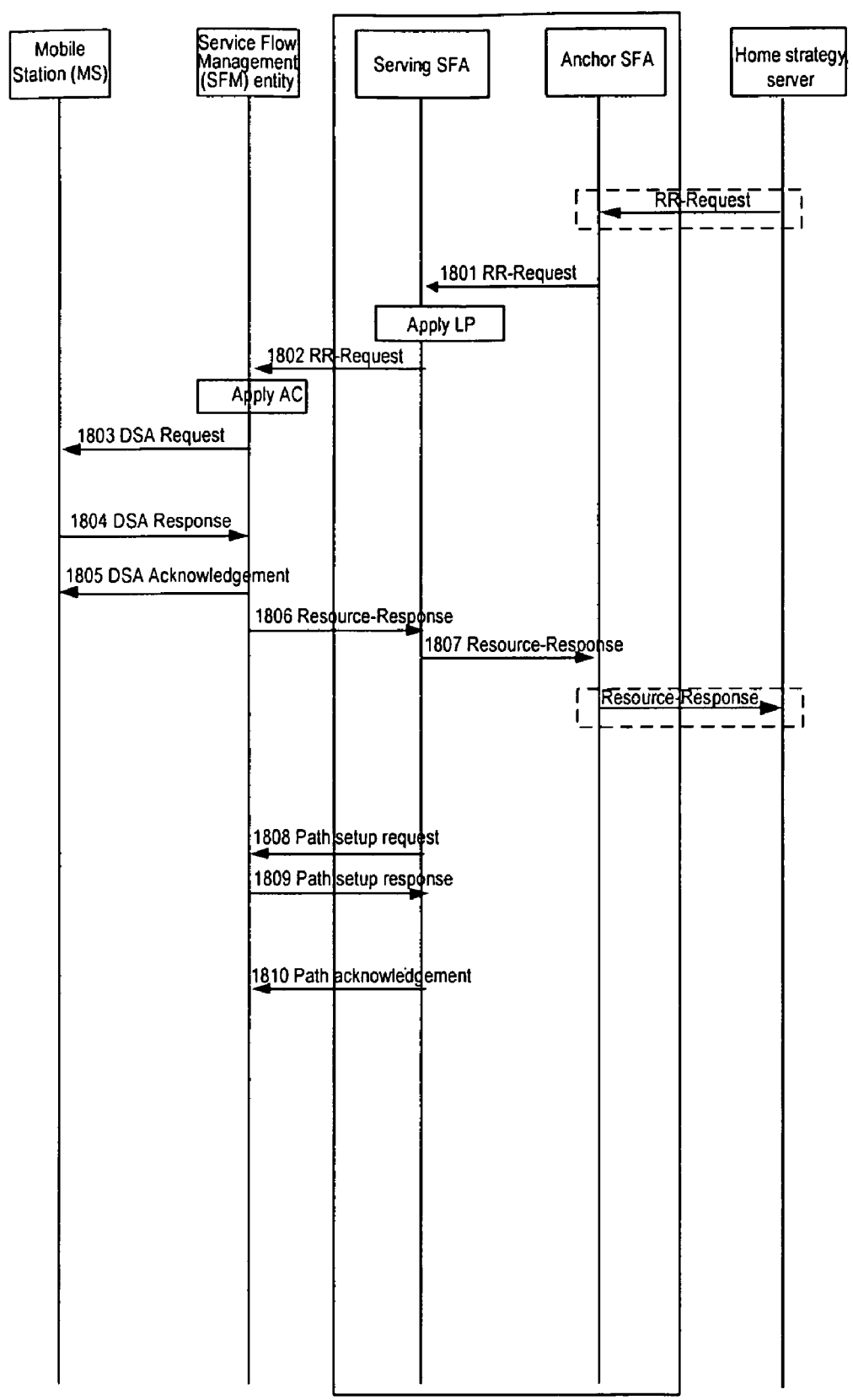
FIG. 18 is a flowchart in mode 2 of creating a network-side service flow according to an embodiment of the present invention.

Embodiment 16: Considering that it takes a relatively long time to create an R1 interface, the $16^{th}$ embodiment sets up the R1 interface before R6. If the service is uplink and the R1 interface is created first, the Base Station (BS) needs to buffer the data from the MS until completion of setting up the R6 interface, as shown in FIG. 18. The network-side DSA process includes the steps as described hereinafter.

Step 1801~step 1804 are the same as step 1701~step 1704 in FIG. 17a.

Step 1805: In this embodiment, the R1 interface is created before R6. Therefore, after receiving a DSA-Response, the SFM sends a DSA-ACK message to the MS directly without making a judgment, thus finishing the air interface creation.

Step 1806~step 1810 are the same as step 1705~step 1709 in FIG. 17a.

Figure 19A:
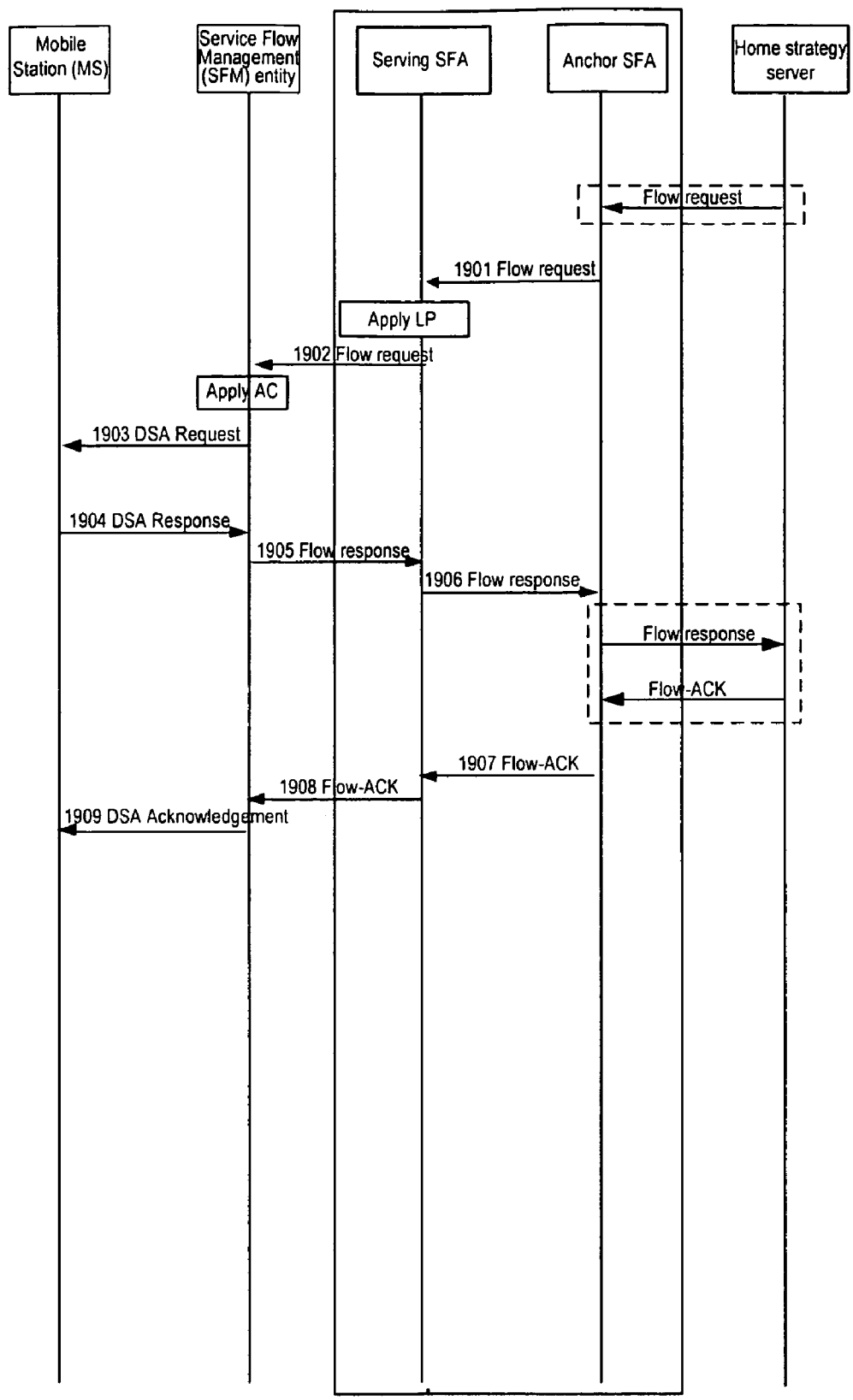
FIG. 19a is an uplink service flowchart in mode 3 of creating a network-side service flow according to an embodiment of the present invention.
Figure 19B:
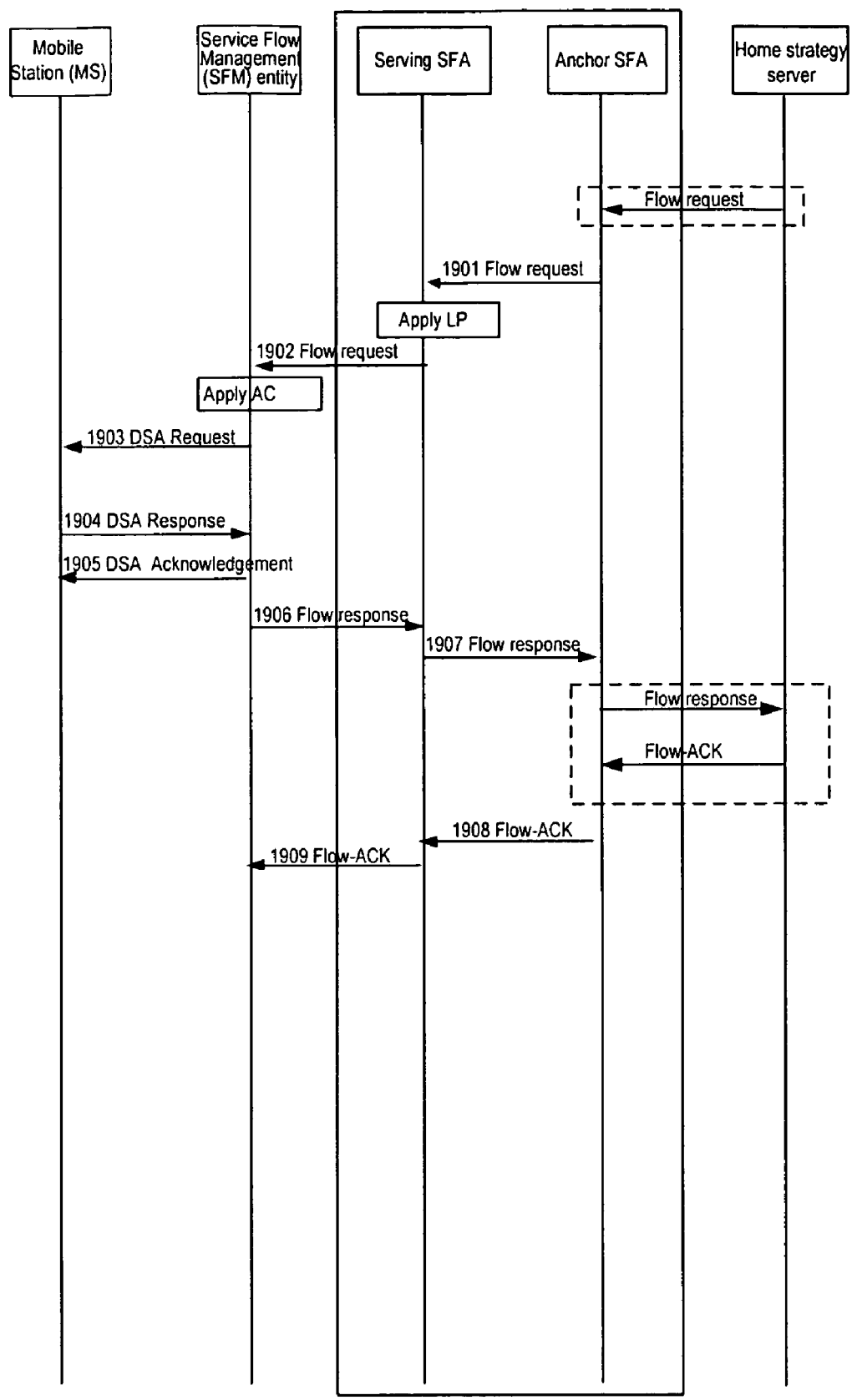
FIG. 19b is a downlink service flowchart in mode 3 of creating a network-side service flow according to an embodiment of the present invention.

Embodiment 17: The 17$^{th}$ embodiment decides the sequence of setting up the R1 interface and the R6 interface according to the direction of the service flow to be created, in which the resource request/response process, the data path setup request/response process and the air interface acknowledgement processes are executed concurrently. If the service flow is uplink, the R6 interface is created before R1, as shown in FIG. 19a; if the service flow is downlink, the R1 interface is created before R6, as shown in FIG. 19b. The process of creating a network-side service flow includes the steps (taking FIG. 19a as an example) as described hereinafter.

Step 1901: After the anchor SFA is registered on the MS to access the network, the network side initiates a process of creating a service flow. The network-side service flow creation is triggered if the network side sends a flow request to the anchor SFA through a V/H PF server or the anchor SFA decides to create a service flow at its discretion. After the network-side service flow creation is triggered, a flow request is sent to the anchor SFA through a V/H-PF server, or sent by the anchor SFA directly. The anchor SFA applies the local policy and sends a flow request message to the SFM, with the message carrying the QoS parameter set of the RR-Request, the header compression rule parameter, the resource reservation type parameter and the request information. If the flow request is sent from the V/H-PF server, such parameters are sent from the PF server, and the anchor SFA saves the corresponding parameters. The flow request message sent by the anchor SFA to the SFM also carries the corresponding parameters of the data path for the purpose of path setup.

Step 1902: After receiving the flow request message, the serving SFA judges whether to approve the resource request or not, depending on the application service policy. If the resource request is rejected, the serving SFA returns a flow response message to the anchor SFA directly, with the failure result carried in the message, thus finishing the DSA process.

If the resource request is approved, the serving SFA judges whether the data path is based on service flows, or whether the data path is not created. If so, the serving SFA initiates a path setup process to the SFM, namely, the parameters carried in the flow request message sent by the serving SFA to the SFM require resource reservation and data path setup; meanwhile, the serving SFA saves the corresponding parameters. If no data path needs to be created, the flow request message sent to the SFM does not carry the parameters related to path setup.

Step 1903: After receiving a flow request message, the SFA applies the local policy and sends a DSA-Request message to the MS, with the message carrying the QoS parameter set, the header compression rule parameter and the resource reservation type parameter. The MS saves the corresponding parameters.

Step 1904: After receiving the DSA-Request, the MS saves the corresponding QoS parameters and the header compression rule parameter, and returns a DSA-Response message to the SFM, with the DSA result carried in the message.

Step 1905: In this embodiment, the sequence of setting up the R1 interface and the R6 interface is decided according to the direction of the service flow to be created. Therefore, after receiving a DSA-Response, the SFM needs to make a judgment: if the service flow to be created is downlink, the SFM sends a DSA-ACK message to the MS directly to finish creating an air interface, as shown in FIG. 19b; and then the SFM sends a Resource-Response to the network side. If the service flow to be created is uplink, the SFM sends a Resource-Response message to the serving SFA at the network side directly, with the resource request result carried in the message, as shown in FIG. 19a. The following description still takes FIG. 19a as an example.

Step 1906: The serving SFA returns a flow response message to the anchor SFA, with the resource reservation result carried in the message.

Step 1907: After the anchor SFA receives the flow response, if the flow request is sent by the V/H-PF server, the anchor SFA needs to send the flow response message to the V/H-PF server, with the message carrying the resource reservation result and the corresponding parameters; and then the V/H-PF server returns a Flow-ACK message to the anchor SFA; if the DSA-Request is not sent by the V/H-PF server, the anchor SFA returns a Flow-ACK to the serving SFA directly.

Step 1908: After receiving the Flow-ACK, the serving SFA transfers the Flow-ACK to the SFM.

Step 1909: After receiving the Flow-ACK, the SFM further sends a DSA-ACK message to the MS, thus finishing the air interface creation.

Now, the network-side service flow is created.

Therefore, for the embodiment shown in FIG. 19a, the DSA-Request received by the serving SFA from the anchor SFA carries resource processing request parameters and a resource processing indication; the request sent by the serving SFA to the SFM carries resource processing request parameters, a resource processing indication, Path-Request parameters, and a path processing indication. If no data path needs to be created, the subsequent request does not need to carry Path-Request parameters or path processing indication. A resource processing indication is an indication of adding, changing or deleting a resource; the Path-Request parameter and the data path processing indication are parameters required for data path processing; a data path processing indication is an indication of adding, changing or deleting a data path. In this embodiment, the resource processing indication indicates the operation of adding a service flow, and the data path processing indication also indicates the operation of adding a data path. Besides, the flow request should also include a resource reservation type parameter and/or a header compression rule parameter in addition to the previous contents. In other embodiments (including network-side service flow adding, changing and deleting), the same applies.

Figure 20:
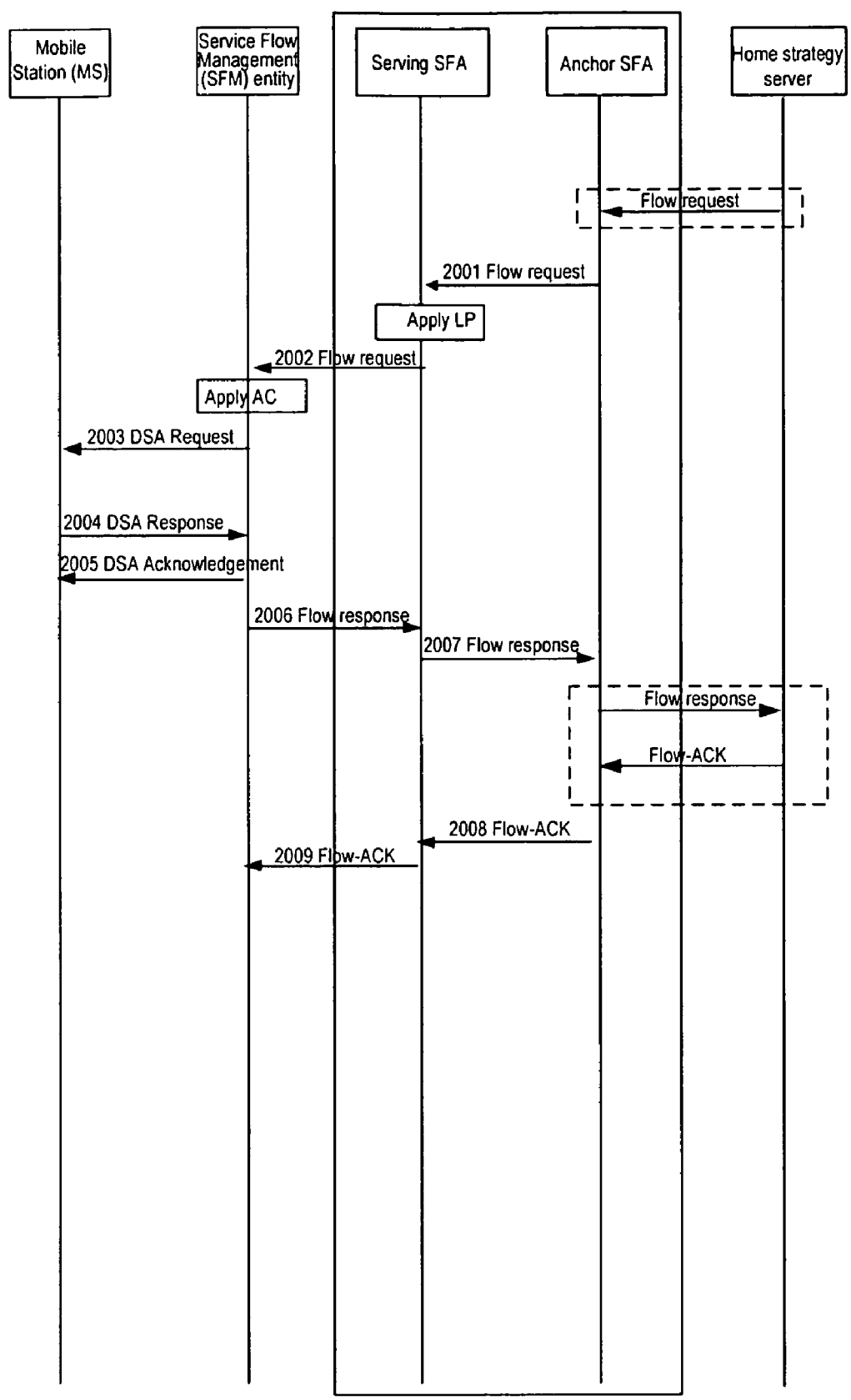
FIG. 20 is a flowchart in mode 4 of creating a network-side service flow according to an embodiment of the present invention.

Embodiment 18: Considering that it takes a relatively long time to create an R1 interface, the 16$^{th}$ embodiment sets up the R1 interface before R6. If the service is uplink and the R1 interface is created first, the Base Station (BS) needs to buffer the data from the MS until completion of setting up the R6 interface, as shown in FIG. 20. The network-side DSA process includes the steps as described hereinafter.

Step 2001~step 2004 are the same as step 1901~step 1904 in FIG. 19a.

Step 2005: In this embodiment, the R1 interface is created before R6. Therefore, after receiving a DSA-Response, the SFM sends a Flow-ACK message to the MS directly without making a judgment, thus finishing the air interface creation.

Step 2006~step 2009 are the same as step 1905~step 1908 in FIG. 19a.

Described below is a process of deleting a network-side service flow.

Figure 21A:
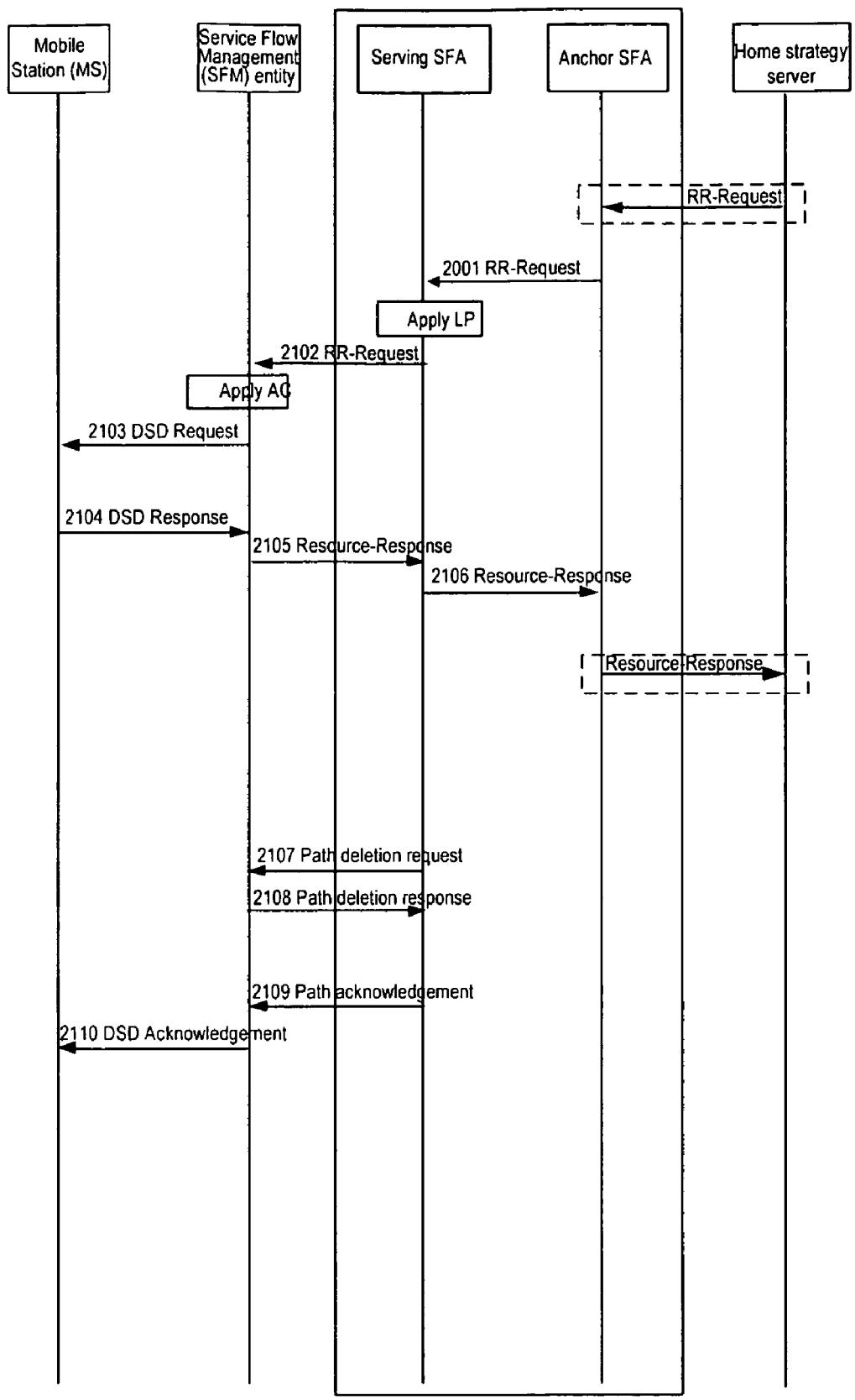
FIG. 21a is a downlink service flowchart in mode 1 of deleting a network-side service flow according to an embodiment of the present invention.
Figure 21B:
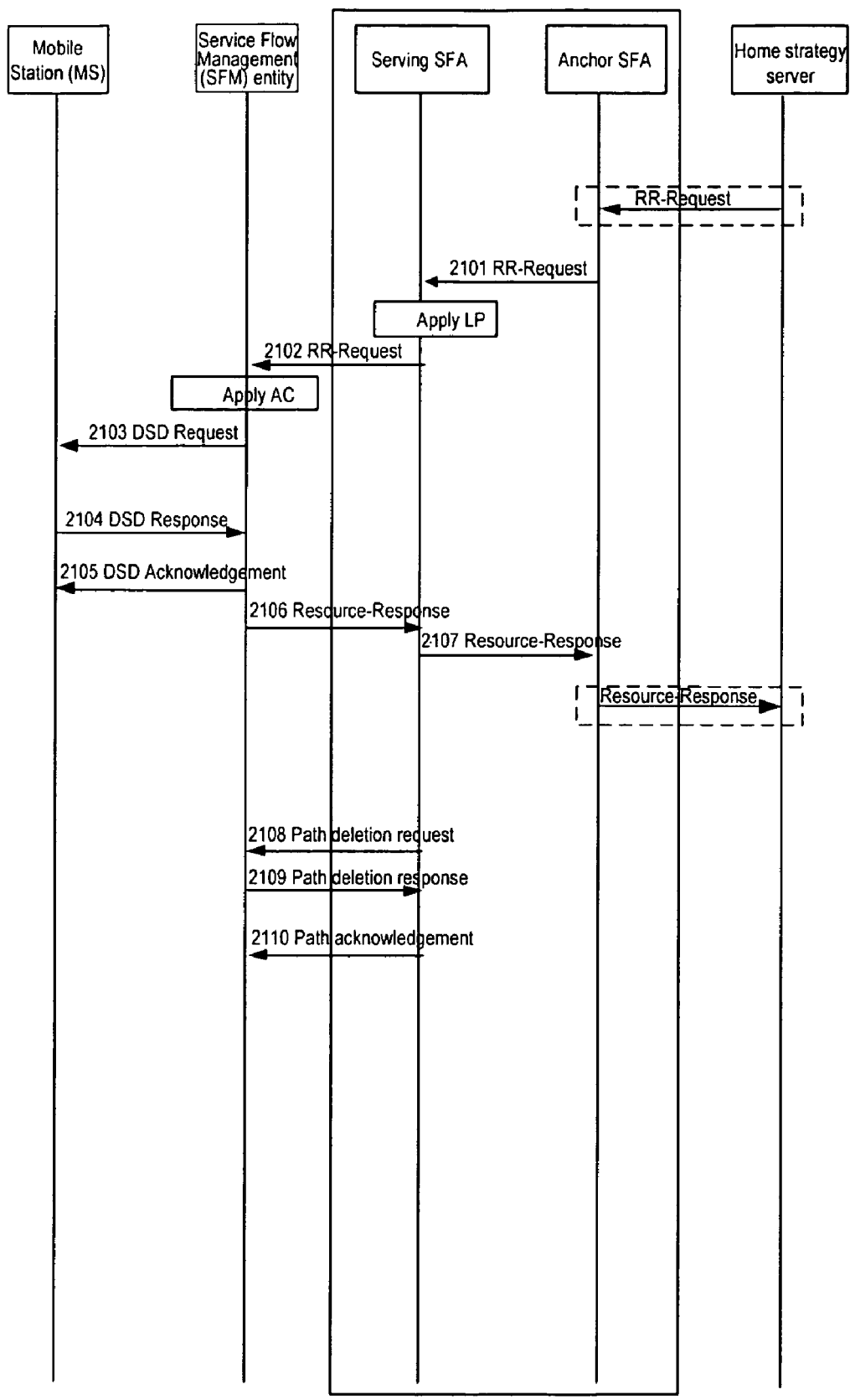
FIG. 21b is an uplink service flowchart in mode 1 of deleting a network-side service flow according to an embodiment of the present invention.

Embodiment 19: The 19th embodiment decides the sequence of deleting the R1 interface and the R6 interface according to the direction of the service flow to be deleted. If the service flow is downlink, the R6 interface is deleted before R1, as shown in FIG. 21a; if the service flow is uplink, the R1 interface is deleted before R6, as shown in FIG. 21b. The process of deleting a network-side service flow includes the steps (taking FIG. 21a as an example) as described hereinafter.

Step 2101~step 2104 are the same as step 1701~step 1704 in FIG. 17, except different parameters carried in the request/response message and different functions executed.

Step 2105: In this embodiment, the sequence of deleting the R1 interface and the R6 interface is decided according to the direction of the service flow to be deleted. Therefore, after receiving a DSD-Response, the SFM needs to make a judgment: if the service flow to be deleted is uplink, the SFM sends a DSD-ACK message to the MS directly to finish deleting an air interface, as shown in FIG. 21b; and then the SFM sends a Resource-Response to the network side. If the service flow to be deleted is downlink, the SFM sends a Resource-Response message to the serving SFA at the network side directly, with the resource request result carried in the message, as shown in FIG. 21a.

Step 2106~step 2110 are the same as step 1706~step 1710 in FIG. 17a, except different parameters carried in the request/response message and different functions executed.

Besides, in step 2106, after receiving a Resource-Response, the serving SFA judges whether the data path is based on service flows, or whether the data path bears no other service flow. If so, the serving SFA initiates a data path deletion process to the SFM.

Figure 22:
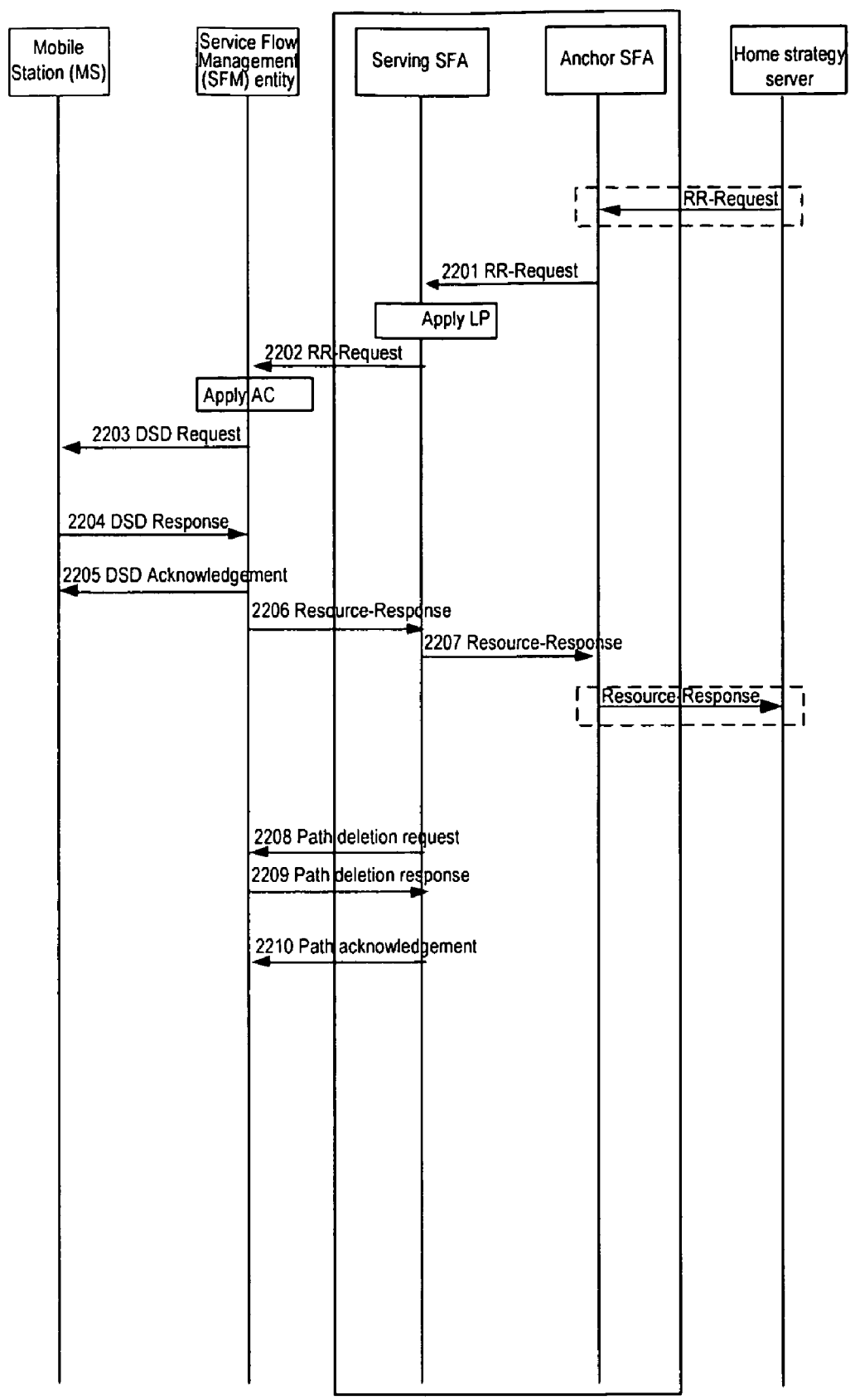
FIG. 22 is a flowchart in mode 2 of deleting a network-side service flow according to an embodiment of the present invention.

Embodiment 20: Considering that it takes a relatively long time to delete an R1 interface, this embodiment deletes the R1 interface before R6. As shown in FIG. 22, a process of deleting a network-side service flow includes the steps as described hereinafter.

Step 2201~step 2204 are the same as step 2101~step 2104.

Step 2205: In this embodiment, the R1 interface is deleted before R6. Therefore, after receiving a DSD-Response, the SFM sends a DSD-ACK message to the MS directly without making any judgment, thus finishing the air interface deletion.

Step 2206 step 2210 are the same as step 2106 step 2110 in FIG. 21b.

Figure 23A:
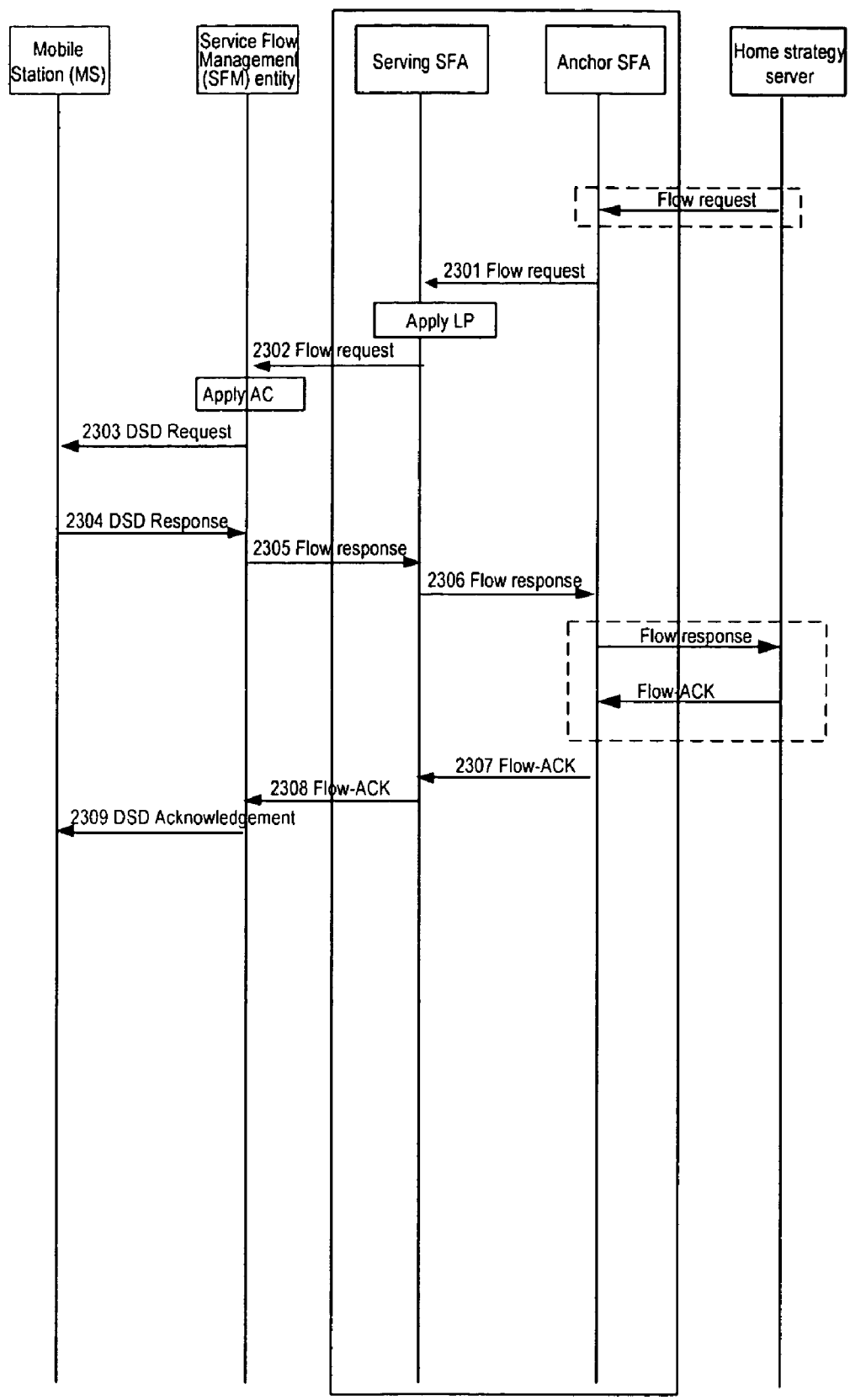
FIG. 23a is a downlink service flowchart in mode 3 of deleting a network-side service flow according to an embodiment of the present invention.
Figure 23B:
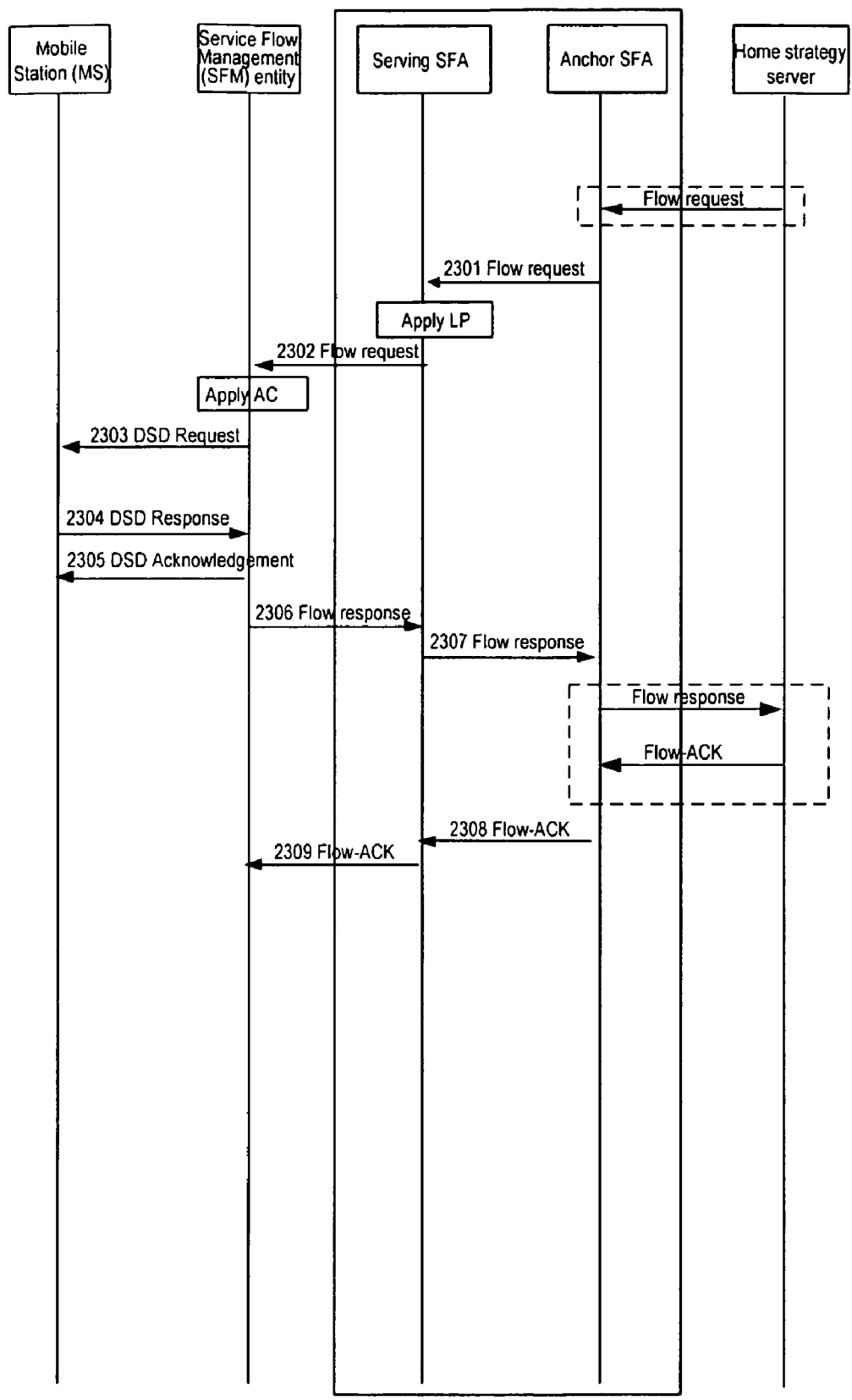
FIG. 23b is an uplink service flowchart in mode 3 of deleting a network-side service flow according to an embodiment of the present invention.

Embodiment 21: The 21$^{st}$ embodiment decides the sequence of deleting the R1 interface and the R6 interface according to the direction of the service flow to be deleted. If the service flow is downlink, the R6 interface is deleted before R1, as shown in FIG. 23a; if the service flow is uplink, the R1 interface is deleted before R6, as shown in FIG. 23b. The process of deleting a network-side service flow includes the steps as described hereinafter.

Step 2301~step 2304 are the same as step 1901~step 1904 in FIG. 19a, except different parameters carried in the request/response message and different functions executed. Besides, in step 2302, when sending a flow request, the serving SFA judges whether the data path is based on service flows, or whether the data path bears no other service flow. If so, the serving SFA initiates a data path deletion process to the SFM. The flow request carries the information required for deleting a data path.

Step 2305: In this embodiment, the sequence of deleting the R1 interface and the R6 interface is decided according to the direction of the service flow to be deleted. Therefore, after receiving a DSD-Response, the SFM needs to make a judgment: if the service flow to be deleted is uplink, the SFM sends a DSD-ACK message to the MS directly to finish deleting an air interface, and then the SFM sends a Flow-Response to the network side, as shown in FIG. 23b. If the service flow to be deleted is downlink, the SFM sends a Flow-Response message to the network side directly, as shown in FIG. 23a.

Step 2306~step 2309 are the same as step 1906~step 1909 in FIG. 19a, except different parameters carried in the request/response message and different functions executed.

Figure 24:
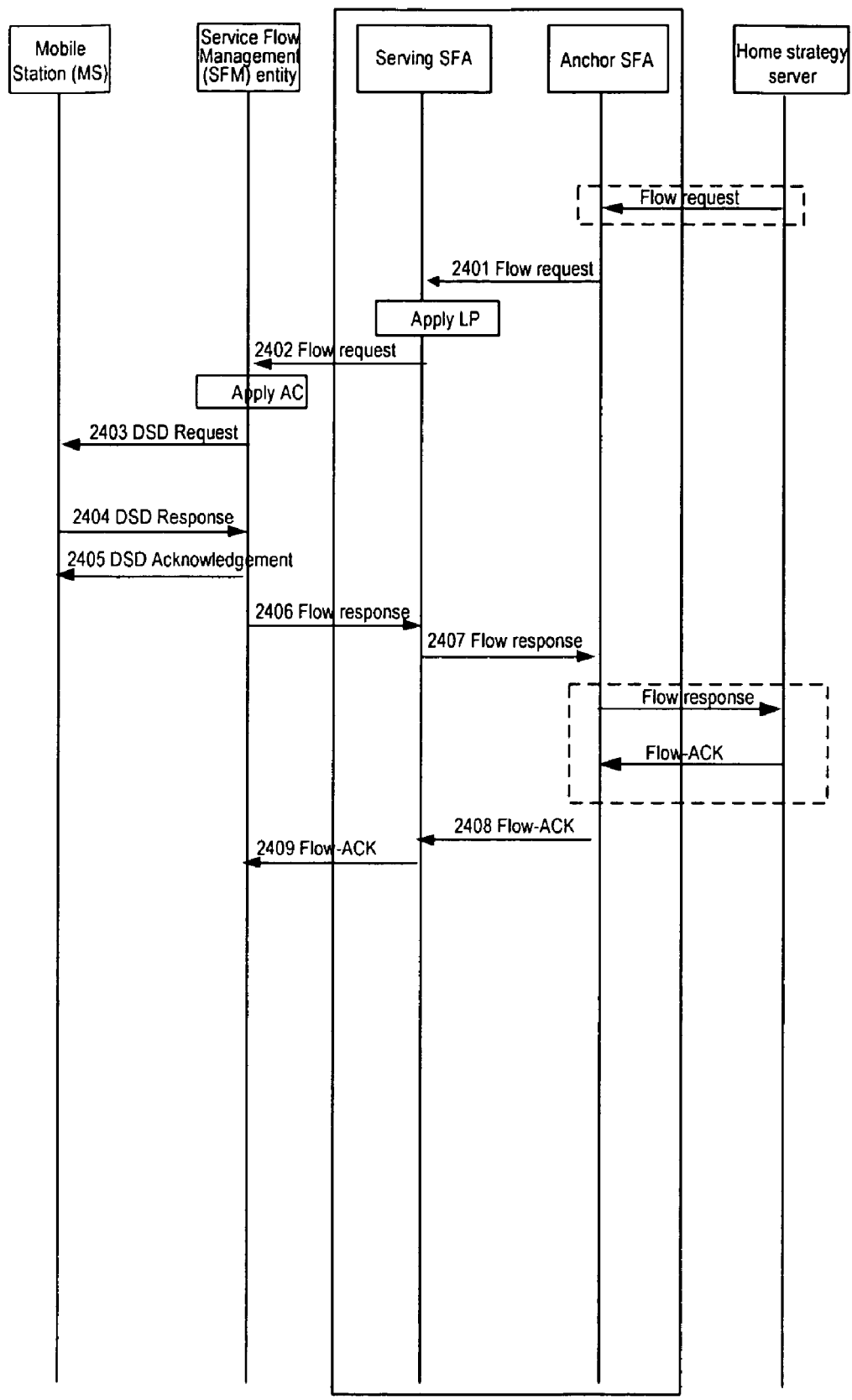
FIG. 24 is a flowchart in mode 4 of deleting a network-side service flow according to an embodiment of the present invention.

Embodiment 22: Considering that it takes a relatively long time to delete an R1 interface, this embodiment deletes the R1 interface before R6. As shown in FIG. 24, the process of deleting a network-side service flow includes the steps as described hereinafter.

Step 2401~step 2404 are the same as step 2301~step 2304 in FIG. 23a.

Step 2405: In this embodiment, the R1 interface is deleted before R6. Therefore, after receiving a DSD-Response, the SFM sends a DSD-ACK message to the MS directly, thus finishing the air interface deletion.

Step 2406~step 2409 are the same as step 2306~step 2309 in FIG. 23b.

Figure 25A:
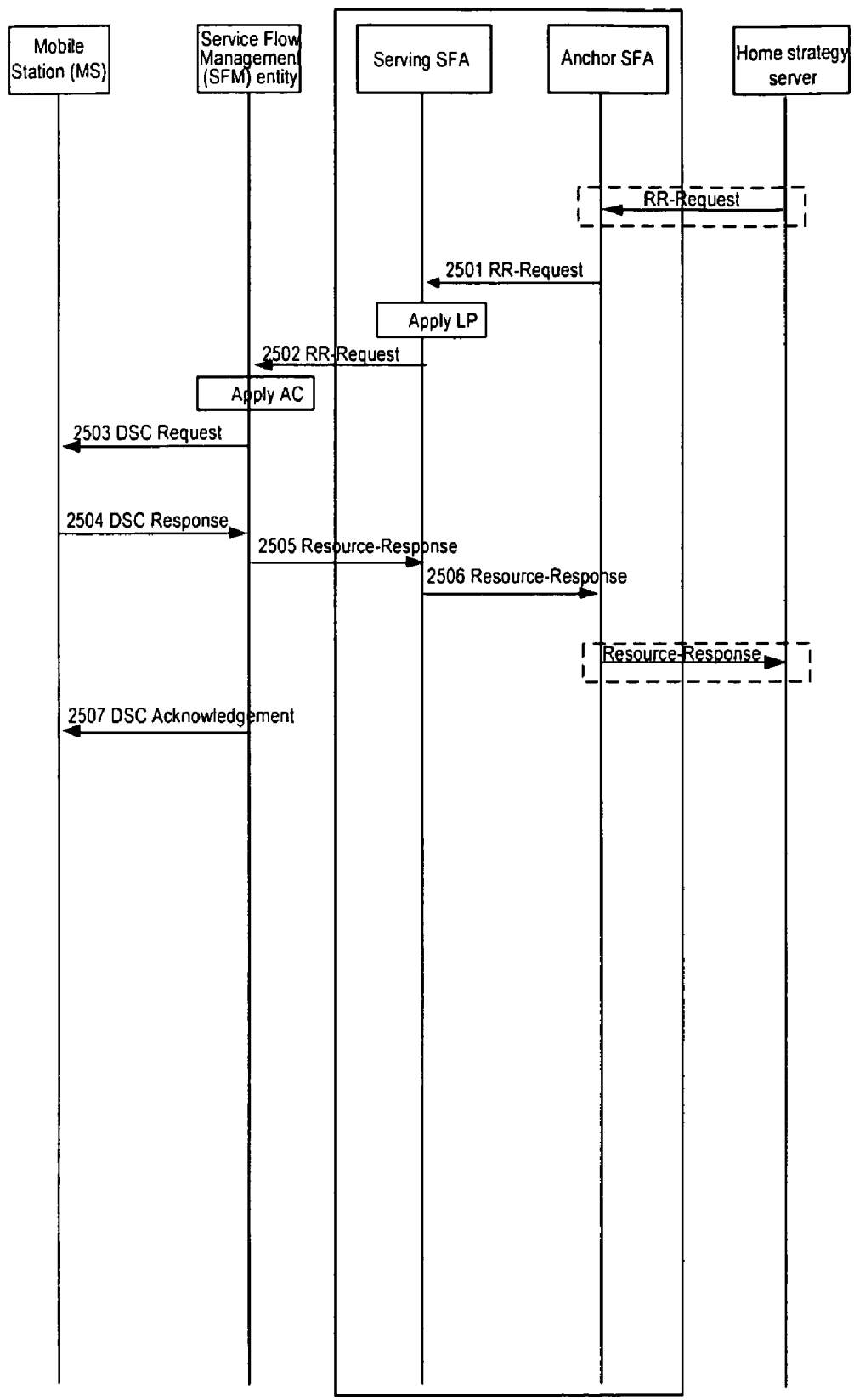
FIG. 25a is an uplink service flowchart in mode 1 of changing a network-side service flow according to an embodiment of the present invention.
Figure 25B:
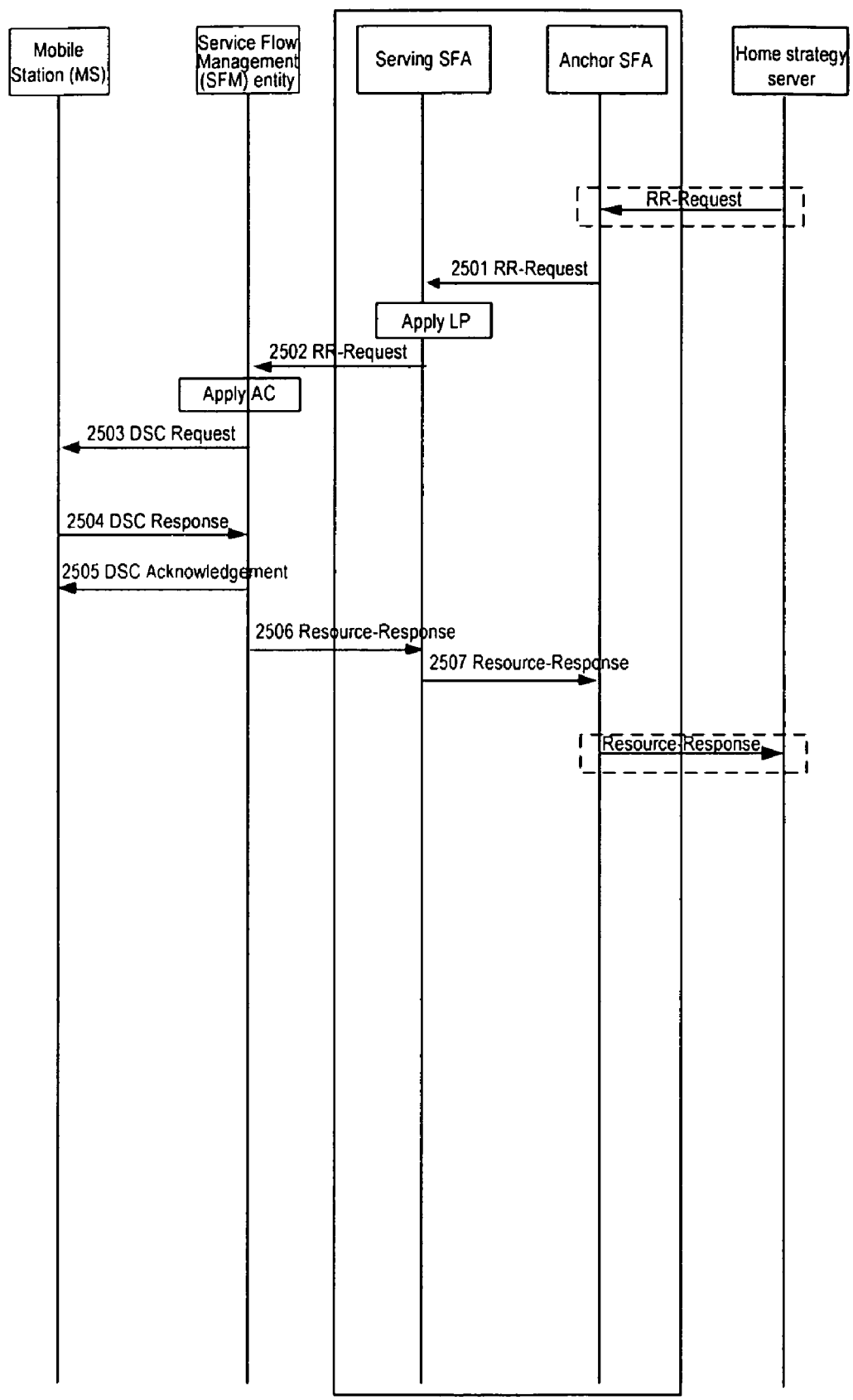
FIG. 25b is a downlink service flowchart in mode 1 of changing a network-side service flow according to an embodiment of the present invention.

Embodiment 23: The 23rd embodiment decides the sequence of changing the R1 interface and the R6 interface according to the direction of the service flow to be changed. If the service flow is uplink, the R6 interface is changed before R1, as shown in FIG. 25a; if the service flow is downlink, the R1 interface is changed before R6, as shown in FIG. 25b. The process of changing a network-side service flow includes the steps as described hereinafter.

Step 2501~step 2504 are the same as step 1701~step 1704 in FIG. 17a, except different parameters carried in the message and different functions executed. It should be noted that the RR-Request here carries the path-related parameters and the header compression rule parameter.

Step 2505: In this embodiment, the sequence of changing the R1 interface and the R6 interface is decided according to the direction of the service flow to be changed. Therefore, after receiving a DSC-Response, the SFM needs to make a judgment: if the service flow to be changed is downlink, the SFM sends a DSC-ACK message to the MS directly to finish changing an air interface, as shown in FIG. 25b; and then the SFM sends a Resource-Response to the network side. If the service flow to be changed is uplink, the SFM sends a Resource-Response message to the serving SFA at the network side directly, with the resource request result carried in the message, as shown in FIG. 25a.

Step 2506: The serving SFA transfers the Resource-Response to the anchor SFA.

Step 2507: The SFM sends a DSC-ACK to the MS.

Figure 26:
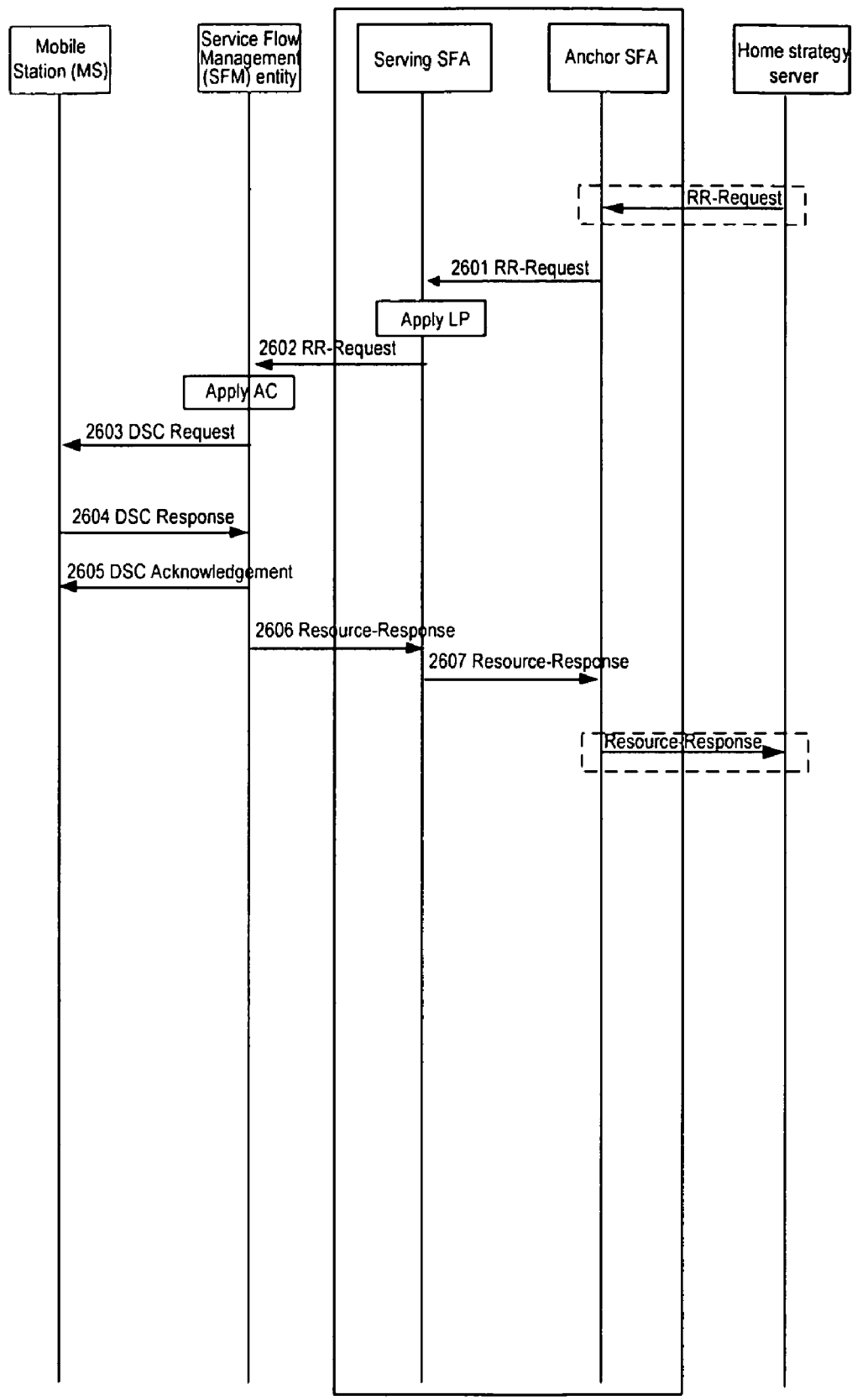
FIG. 26 is a flowchart in mode 2 of changing a network-side service flow according to an embodiment of the present invention.

Embodiment 24: Considering that it takes a relatively long time to delete an R1 interface, this embodiment changes the R1 interface before R6. As shown in FIG. 26, a process of changing a network-side service flow includes the steps as described hereinafter.

Step 2601~step 2604 are the same as step 2501~step 2504 in FIG. 25a. It should be noted that the RR-Request here carries the path-related parameters and the header compression rule parameter.

Step 2605: In this embodiment, the R1 interface is changed before R6. Therefore, after receiving a DSC-Response, the SFM sends a DSC-ACK message to the MS, thus finishing the air interface change.

Step 2606: The SFM sends a Resource-Response to the serving SFA.

Step 2607: The serving SFA transfers the Resource-Response to the anchor SFA.

The name of a function entity is not limited to the names mentioned in the previous embodiments, and all the function entities of different names but the same functions fall in the scope of protection defined by the following claims or their equivalents.

It is understandable that, like the dynamic service flow processing, the processes of creating, changing and deleting a service flow are rather similar and can be collectively called a "network-side service flow processing process". Moreover, in the practical application, the messages applied to such processes are almost the same, except the parameters carried in the messages. For example, when an SFM sends a service flow processing request carrying a processing indication to the MS, the MS can identify the type of the processing request according to the content of the processing indication such as addition, change and deletion. Other aspects are similar.

A communication apparatus disclosed in an embodiment of the present invention includes: a Service Flow Management (SFM) entity, adapted to:
(i) receive dynamic service flow processing requests from the UE; send resource processing requests to the anchor Service Flow Authorization (SFA) entity; and/or receive resource processing requests from the anchor SFA entity, wherein the resource processing request carries a processing indication and relevant parameters, and the SFM entity sends a service flow processing request carrying a processing indication to the UE after deciding to perform processing;
(ii) send a policy decision request (PD-Request) to the anchor SFA, and receive a PD-Response; and
(iii) send a data path processing request to the serving SFA, and receive a data path processing response; and/or receive a data path processing request from the serving SFA, and send a data path processing response to the serving SFA.

It is understandable that the serving SFA and the anchor SFA mentioned above may be located in the same physical entity or in different physical entities. If the serving SFA and the anchor SFA are located in the same physical entity, the serving SFA and the anchor SFA are the same logic entity.

The embodiments described above are only better ones of this invention, and they are not used to confine the protection scope of this invention. Any change, equivalent replacement and improvement within the spirit and principle of this invention shall be included in the protection scope of this invention.

What is claimed is:

1. A method for processing dynamic service flows, comprising the following processes implemented by network side:
resource processing: sending, by a Service Flow Management (SFM) entity, a resource processing request to a Home Policy Flow (H-PF) server through an anchor Service Flow Authorization (SFA) entity according to a dynamic service flow processing request sent by an User Equipment (UE), and sending, by the H-PF server, a resource processing response to the SFM entity, the resource processing response carrying the results of resource processing performed by the H-PF server according to the resource processing request;
air interface acknowledgement: returning, by the SFM entity, a service flow processing response to the UE;
wherein the network side further comprises a serving SFA entity, the serving SFA and the anchor SFA located in the same physical entity or in different physical entities, wherein, if the serving SFA and the anchor SFA are located in the same physical entity, the serving SFA and the anchor SFA are the same logic entity and, if the serving SFA and the anchor SFA are located in different physical entities, the messages of the SFM pass through the serving SFA before arriving at the anchor SFA; the messages of the H-PF server pass through the anchor SFA before arriving at the serving SFA;
wherein the method further comprises a data path processing process comprising sending, by the SFM, a data path processing request to the serving SFA, with a data path processing indication carried in the data path processing request; returning, by the serving SFA, a data path processing response to the SFM after the serving SFA performs processing; and sending, by the SFM, an acknowledgement to the serving SFA;
wherein the data path processing indication is an indication of adding, changing or deleting a data path; and
wherein the process for the serving SFA to perform processing comprises creating, changing or deleting a data path.

2. The method of claim 1, before the resource processing, further comprising:
a policy decision process: sending, by the SFM a policy decision request (PD-Request) and to the H-PF server through the serving SFA and the anchor SFA; deciding by the H-PF whether to allow processing of the service flow according to a user database and a service policy, and sending a policy decision response (PD-Response) to the SFM.

3. The method of claim 2, wherein the policy decision, resource processing and data path processing are executed concurrently before the air interface acknowledgement;
the concurrent execution of the policy decision, resource processing, and data path processing is specifically as follows:
the serving SFA receives a flow request from the SFM, wherein the flow request comprises PD-Request parameters, resource processing request parameters, a resource processing indication, Path-Request parameters, and a data path processing indication; and sends the PD-Request parameters, the resource processing request parameters, and the resource processing indication to the H-PF server through an anchor SFA; the resource processing indication is an indication of creating, changing or deleting a resource; and
the anchor SFA sends the flow response to the serving SFA, after receiving a flow response from the H-PF server; the flow response comprises policy decision response information and resource processing response information; the serving SFA returns the data path processing response together with the policy decision response and the resource processing response as a flow response message to the SFM.

4. The method according to claim 3, wherein the service flow request received by the serving SFA from the SFM further comprises a resource reservation type parameter and/or a header compression rule parameter.

5. The method of claim 2, wherein:
the PD-Response returned by the H-PF server to the anchor SFA carries a header compression rule parameter, if the H-PF server allocates a header compression rule parameter;
the resource processing response returned by the anchor SFA to the SFM through a serving SFA carries a header compression rule parameter;
the service flow processing response returned by the SFM to the UE carries a header compression rule parameter; or,
if the H-PF server allocates no header compression rule parameter, the anchor SFA allocates a header compression rule parameter before returning a resource processing response to the SFM through a serving SFA, and then transfer the parameter to the SFM through a resource processing response;
the service flow processing response returned by the SFM to the UE carries a header compression rule parameter; or, if the service flow processing request sent by the UE carries a header compression rule parameter, the resource processing request sent by the SFM to the anchor SFA carries the header compression rule parameter specified by the UE.

6. A method for processing network-side service flows, wherein the network side implements the following process:

resource processing: receiving, by a SFM entity, a resource processing request from an anchor SFA entity, the resource processing request carrying a processing indication; sending, by the SFM entity, a service flow processing request to an UE, the service flow processing request carrying a processing indication; receiving, by the SFM entity, a service flow processing response from the UE; and sending, by the SFM entity, a resource processing response to the anchor SFA entity;

wherein the network side further comprises a serving SFA entity, the serving SFA and the anchor SFA being be located in the same physical entity or in different physical entities; wherein if the serving SFA and the anchor SFA are located in the same physical entity, the serving SFA and the anchor SFA are the same logic entity and, if the serving SFA and the anchor SFA are located in different physical entities, the messages of the SFM pass through the serving SFA before arriving at the anchor SFA; the messages sent or transferred by the anchor SFA pass through the serving SFA before arriving at the SFA;

wherein the method further comprises a data path processing process comprising sending, by the serving SFA, a data path processing request to the SFM, with a data path processing indication carried in the request; returning, by the SFM, a data path processing response to the serving SFA after the SFM performs processing according to the data path processing request; and sending, by the serving SFA, an acknowledgement to the SFM;

wherein the data path processing indication is an indication of adding, changing or deleting a data path; and wherein the process for the SFM to perform processing according to data path processing request comprises creating, changing or deleting a data path.

7. The method of claim 6, wherein:

the resource processing comprises: a resource processing request process and a resource processing response process;

the data path processing comprises: a data path processing request process and data path processing response process;

if the serving SFA determines to process the data path:

the resource processing request process and the data path processing request process are executed concurrently, and then the resource processing response process and the data path processing response process are executed, and finally, the air interface acknowledgement is executed; or the resource processing and the data path processing are executed concurrently, and then the air interface acknowledgement is executed, and finally the resource processing response process and the data path processing response process are executed.

8. The method of claim 7, wherein serving SFA determining to process the data path comprises:

if the granularity of the data path is based on service flows or the data path for bearing the service flow is not created, it is determined that a data path needs to be created;

if the data path that bears the network-side service flow is based on this service flow, and if the data path bears no other service flow after this service flow is deleted, it is determined that the data path needs to be deleted.

9. The method of claim 7, wherein the concurrent execution of the resource processing process and the data path request process is specifically as follows:

the serving SFA receives and saves a service flow processing request from the anchor SFA, wherein the request carries resource processing request parameters and a resource processing indication; sends a service flow processing request to the SFM according to the parameters and the local policies; the service flow processing request sent to the SFM carries resource processing request parameters, a resource processing indication, Path-Request parameters, and a data path processing indication;

the SFM receives and saves the service flow processing request from the serving SFA, and sends a service flow processing request to the UE according to the parameters and the local policies; the MS saves the relevant parameters and returns a dynamic service flow processing response to the SFM;

the concurrent execution of the resource processing response process and the data path processing response process is specifically as follows:

the SFM returns the data path processing response together with the resource processing response and relevant parameters as a flow response to the serving SFA, and the serving SFA returns the flow response to the anchor SFA.

10. The method of claim 9, wherein the service flow processing request received by the serving SFA from the anchor SFA and the request sent by the serving SFA to the SFM further carry a resource reservation type parameter and/or a header compression rule parameter.

11. The method of claim 9, wherein the resource processing indication is an indication of adding, changing or deleting a resource; the parameters required for data path processing comprise the Path-Request parameter and the data path processing indication; and the data path processing indication is an indication of creating, changing or deleting a data path.

12. The method of claim 6, comprising an air interface acknowledgement process, wherein the SFM sends a service flow processing acknowledgement to the UE.

* * * * *